(12) United States Patent
Yoshizawa et al.

(10) Patent No.: US 11,223,865 B2
(45) Date of Patent: Jan. 11, 2022

(54) CONTENT VIEWING METHOD AND MOBILE INFORMATION TERMINAL USED FOR SAME

(71) Applicant: Maxell, Ltd., Kyoto (JP)

(72) Inventors: Kazuhiko Yoshizawa, Oyamazaki (JP);
Yasunobu Hashimoto, Oyamazaki (JP);
Hiroshi Shimizu, Oyamazaki (JP);
Yoshinori Okada, Oyamazaki (JP)

(73) Assignee: MAXWELL, LTD., Kyoto (JP)

( * ) Notice: Subject to any disclaimer, the term of this patent is extended or adjusted under 35 U.S.C. 154(b) by 54 days.

(21) Appl. No.: 16/619,905

(22) PCT Filed: Jun. 8, 2017

(86) PCT No.: PCT/JP2017/021304
§ 371 (c)(1),
(2) Date: Dec. 5, 2019

(87) PCT Pub. No.: WO2018/225209
PCT Pub. Date: Dec. 13, 2018

(65) Prior Publication Data
US 2020/0137439 A1   Apr. 30, 2020

(51) Int. Cl.
*H04N 21/258* (2011.01)
*G06F 21/10* (2013.01)
(Continued)

(52) U.S. Cl.
CPC ....... *H04N 21/25816* (2013.01); *G06F 21/10* (2013.01); *H04L 9/0819* (2013.01); *H04N 21/2541* (2013.01)

(58) Field of Classification Search
CPC ....... G06F 13/00; G06F 21/10; H04L 9/0819; H04L 2209/80; H04L 9/0894;
(Continued)

(56) References Cited

U.S. PATENT DOCUMENTS

2015/0106832 A1   4/2015   Yokota et al.

FOREIGN PATENT DOCUMENTS

JP   2002-84520 A   3/2002
JP   2007-140960 A   6/2007
(Continued)

OTHER PUBLICATIONS

International Search Report issued in corresponding International Patent Application No. PCT/JP2017/021304, dated Aug. 29, 2017, with English translation.

*Primary Examiner* — Omar S Parra
(74) *Attorney, Agent, or Firm* — McDermott Will & Emery LLP

(57) ABSTRACT

A content viewing method uses a viewing system including a content distribution server distributing contents, a mobile information terminal, and a viewing device reproducing a content. The mobile information terminal transmits user identification information and a user password to the content distribution server. The content distribution server authenticates the mobile information terminal based on the user identification information and the user password. The mobile information terminal transmits an account issue request requesting an account for reproducing a desired content to the content distribution server. The content distribution server issues the account based on the account issue request and transmits the account to the mobile information terminal. The mobile information terminal stores the account. The mobile information terminal transmits the account by short-range wireless communication. The viewing device stores the account received by short-range wireless communication. The viewing device reproduces the desired content using the stored account.

11 Claims, 12 Drawing Sheets

(51) Int. Cl.
*H04L 9/08* (2006.01)
*H04N 21/254* (2011.01)

(58) Field of Classification Search
CPC .............. H04L 9/3226; H04N 21/2541; H04N 21/25816; H04N 21/2347; H04N 21/26613; H04N 21/4122; H04N 21/4126; H04N 21/43615; H04N 21/43853; H04N 21/44227; H04N 21/4753; H04N 21/63345
See application file for complete search history.

(56) References Cited

FOREIGN PATENT DOCUMENTS

| | | | |
|---|---|---|---|
| JP | 2008-287434 A | 11/2008 |
| JP | 2013-137615 A | 7/2013 |
| JP | WO2014/006668 A1 | 1/2014 |
| JP | 2014-67111 A | 4/2014 |
| JP | 2016-154027 A | 8/2016 |

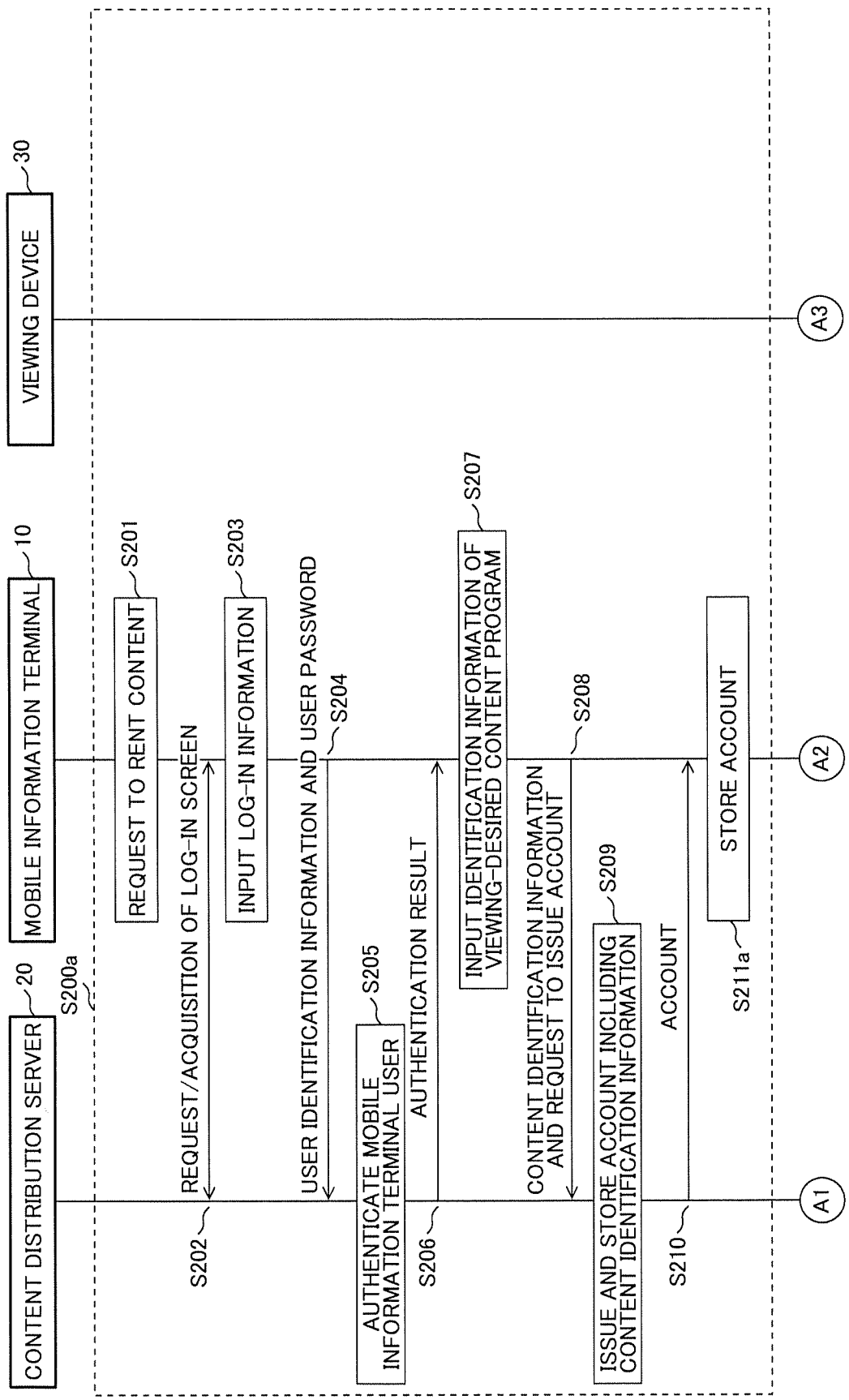
F I G. 2A

F I G. 3
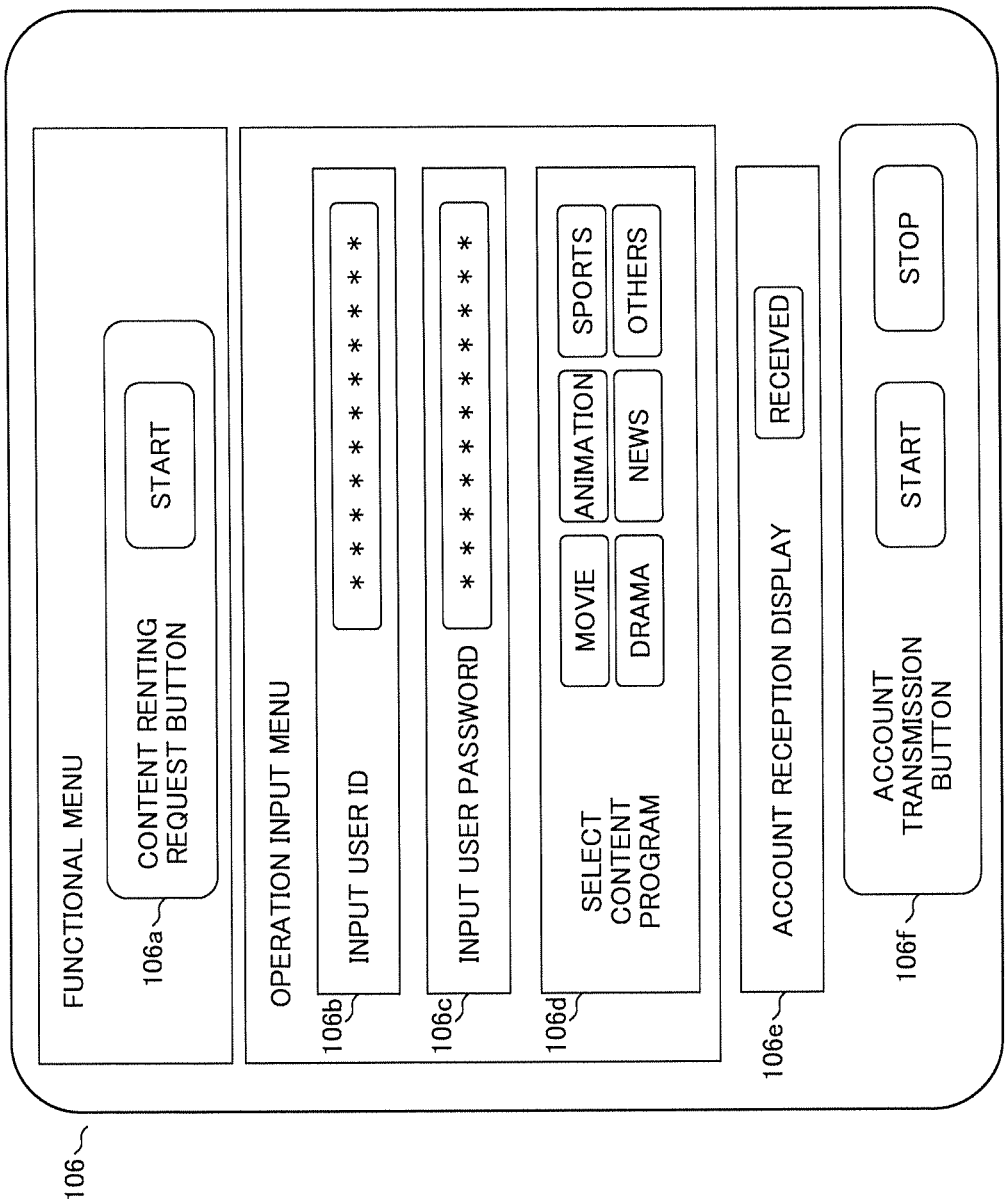

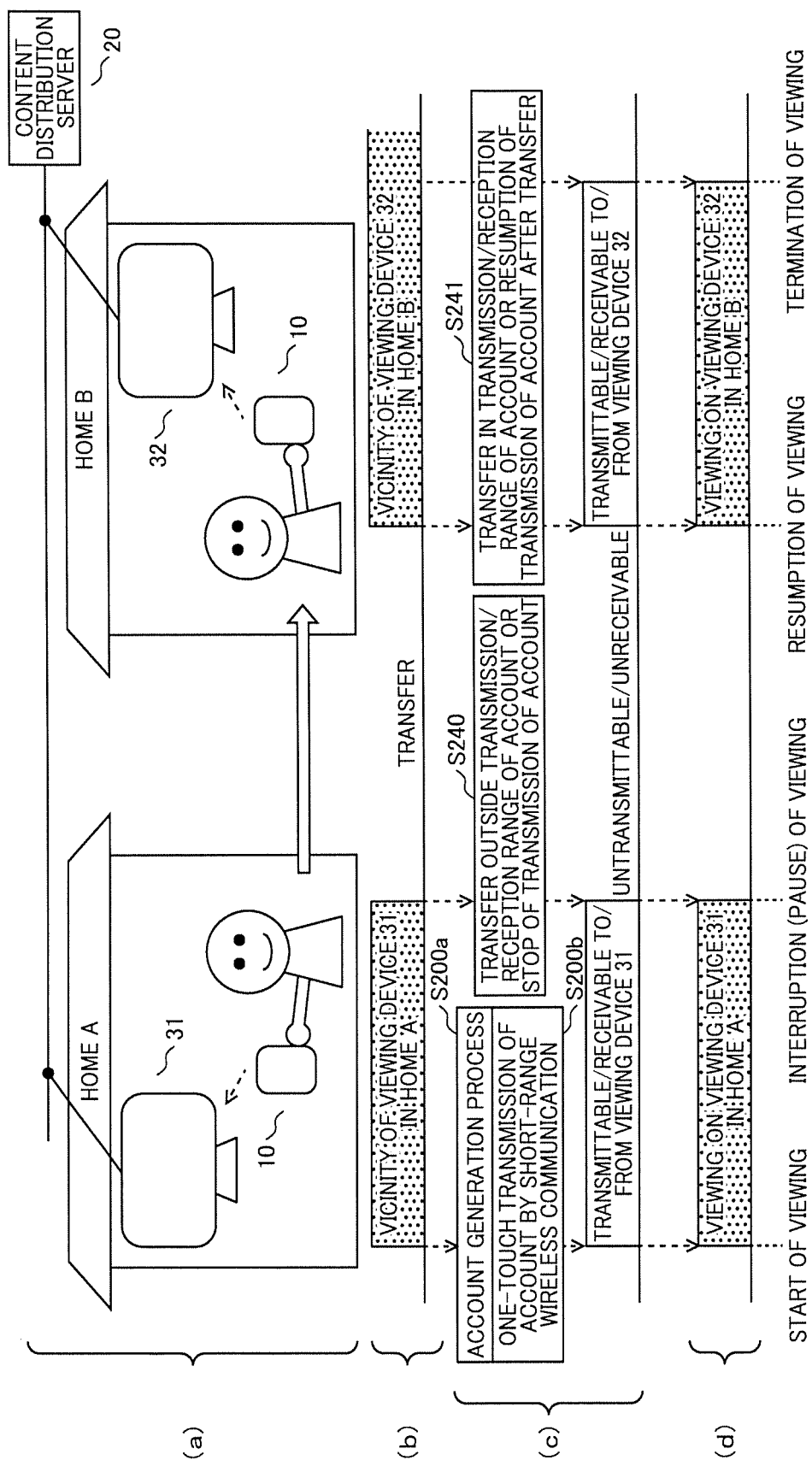
F I G. 4

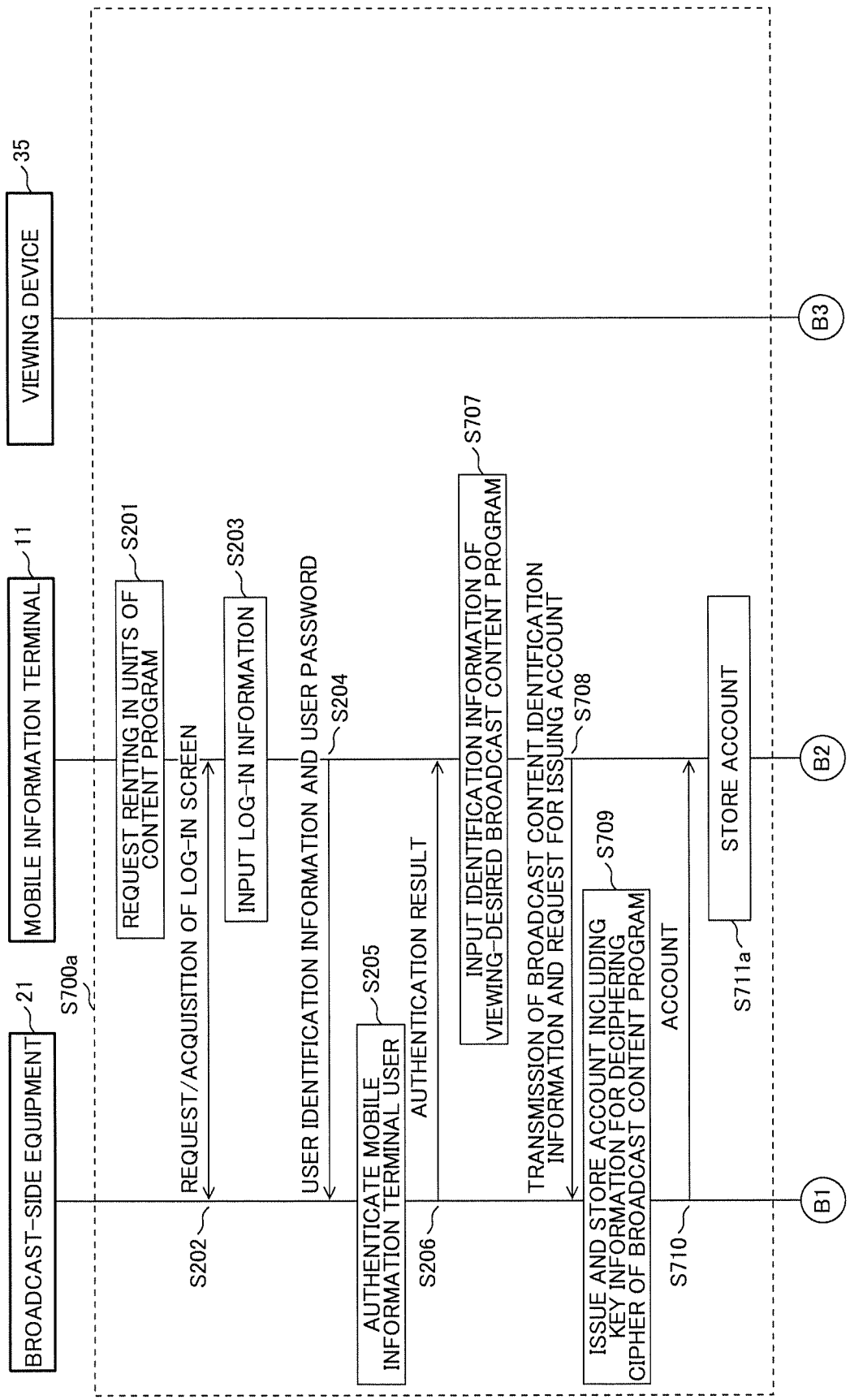

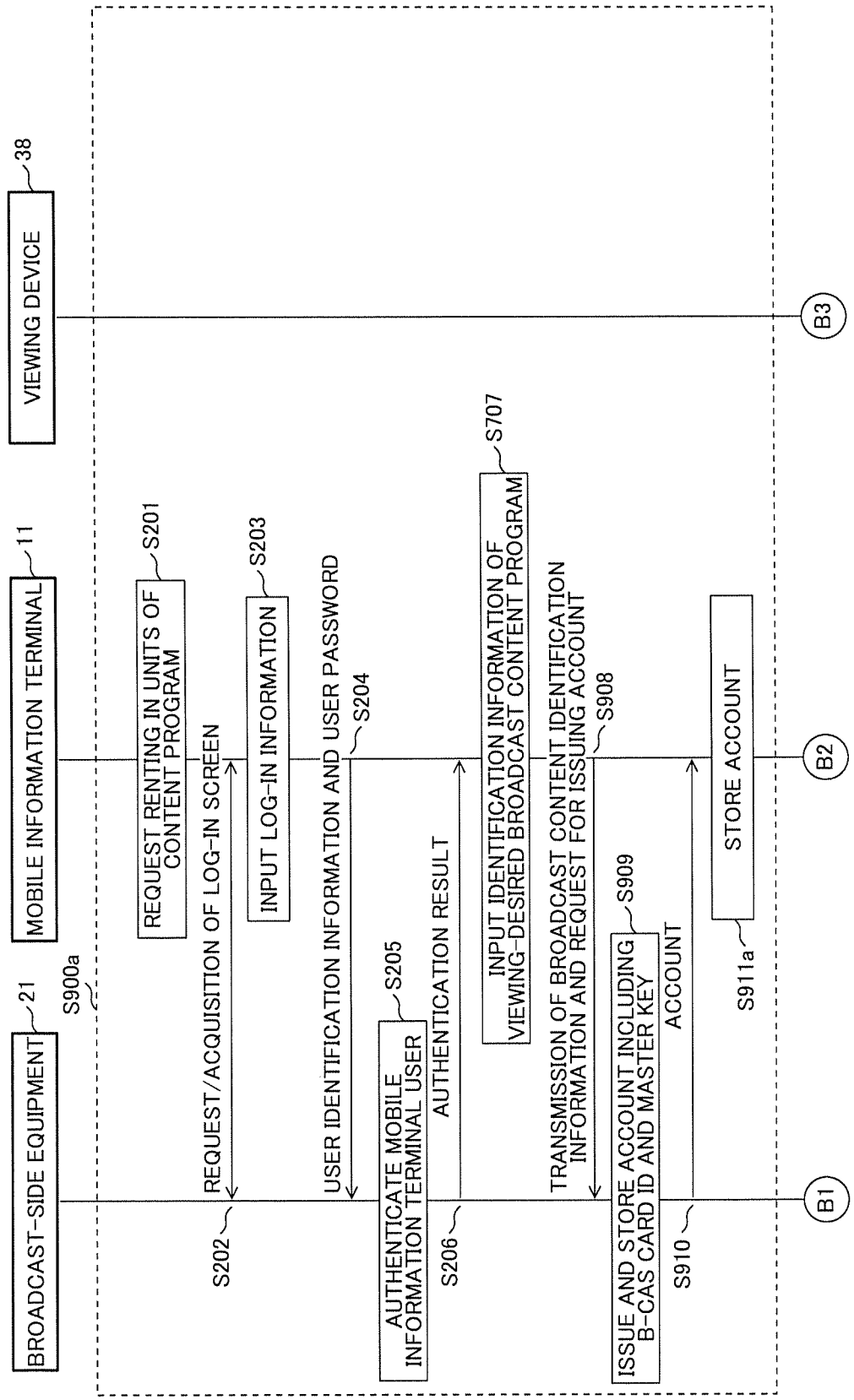

CONTENT VIEWING METHOD AND MOBILE INFORMATION TERMINAL USED FOR SAME

CROSS-REFERENCE OF RELATED APPLICATIONS

This application is the U.S. National Phase under 35 U.S.C. § 371 of International Patent Application No. PCT/JP2017/021304, filed on Jun. 8, 2017, the entire disclosure of which Application is incorporated by reference herein.

TECHNICAL FIELD

The present invention relates to a content distribution system that distributes contents to a viewing device connected to a network and a content viewing system for viewing contents on the viewing device that receives a broadcast wave.

BACKGROUND ART

Heretofore, Digital Right Management (DRM) technology for controlling and limiting usage and a duplication of copyright so as to protect copyright of contents has been used for contents distributed from a content distribution server connected via the Internet and contents transmitted by terrestrial broadcasting or from a broadcast satellite. For a mechanism of the DRM technology, a distributed or broadcast and encrypted content is decrypted, restored and reproduced using unique information to a viewing device that receives the content for an encryption key apart from the content.

Hereby, since another viewing device has no unique information for decrypting and decoding a content even if the content which is distributed or a broadcast of which is received is supplied to the other viewing device, it has been impossible to decode the content, and viewing and it has been impossible to prevent duplication of the content. A method of decoding a content in only a viewing device by a key being unique information to the viewing device includes a method of reproducing the content by collating the key and an identification number (user ID) read in the viewing device of the viewing device, a method of decrypting the encrypted content using the identification number (the user ID) of the viewing device for an encryption key, and a method of multiplexing ciphers such as a first separate key is extracted on the basis of information decrypted using the key of the viewing device, a second separate key is further extracted using the extracted first separate key, and the content encrypted using the second separate key is decrypted.

Further, a content distribution system that enables renting a content to another viewing device and distributing the content utilizing the abovementioned mechanism of the DRM technology, protecting copyright is proposed. For one example, Patent Literature 1 discloses that as content reproduction means of a content receiving device being a renter reproduces a content stored in content storage means on the basis of renting authentication information when the content receiving device being the renter acquires and stores the same content as a content held by a renter from a content distribution device, renting of the content can be freely made.

CITATION LIST

Patent Literature

PTL 1: Japanese Paten Application Laid-Open No. 2007-140960

SUMMARY OF INVENTION

Technical Problem

However, in Patent Literature 1, for example, it is not specially referred that a user is located in a viewable range of a viewing-desired viewing device and views a renting-desired content with simple operation, holding a portable and user-friendly mobile information terminal as one example of an authenticated information transmitting device. In addition, when a user holding a mobile information terminal separates from a viewing device for any reason, a rented content is kept in a reproduced state in the viewing device and Patent Literature 1 does not disclose a configuration that can cope with a state or a situation in which the user views the rented content such as the user misses the rented content.

Moreover, Patent Literature 1 does not refer to a view of a content broadcast using a radio wave on another viewing-desired viewing device, protecting copyright of the content.

Then, it is desired that when a user holding a mobile information terminal views a distributed or broadcast renting-desired content on a viewing device in the vicinity, a content distribution system and a content viewing system which can respectively provide user-friendly viewing environment are provided.

Solution to Problem

One aspect of the present invention is a content viewing method using a viewing system including a content distribution server that distributes a content, a mobile information terminal, and a viewing device that reproduces the content. This method includes a first step in which the mobile information terminal transmits user identification information and a user password to the content distribution server, a second step in which the content distribution server authenticates the mobile information terminal on the basis of the received user identification information and the received user password, a third step in which the mobile information terminal transmits an account issue request for requesting an account for reproducing a desired content to the content distribution server, a fourth step in which the content distribution server issues the account on the basis of the received account issue request and transmits the issued account to the mobile information terminal, a fifth step in which the mobile information terminal stores the received account, a sixth step in which the mobile information terminal transmits the stored account by short-range wireless communication, a seventh step in which the viewing device stores the account received by short-range wireless communication, and an eighth step in which the viewing device reproduces the desired content using the stored account.

Another aspect of the present invention is a mobile information terminal used for a content viewing method using a viewing system including a content distribution server that distributes a content, the mobile information terminal, and the viewing device that reproduces the content. The mobile information terminal is provided with a control unit, a memory unit, a first communication unit for communicating with the content distribution server, a second communication unit shorter in communication distance than the first communication unit for communicating with the viewing device, and an input unit. The memory unit stores user identification information and a user password. The control unit instructs the first communication unit to transmit the user identification information and the user password to the content distribution server. In addition, the control unit instructs the first communication unit to transmit an account issue request for requesting an account for reproducing a desired content to the content distribution server and instructs the first communication unit to store the account received from the content distribution server in the memory unit. Moreover, the control unit instructs the second communication unit to continuously or periodically transmit the account.

Advantageous Effects of Invention

When a user holding the mobile information terminal views a distributed or broadcast renting-desired content on the viewing device in the vicinity of the user, user-friendly viewing environment is acquired. A problem, a configuration and effect except the abovementioned ones will be clarified according to description of the following embodiments.

BRIEF DESCRIPTION OF DRAWINGS

FIG. 2A shows a former half of an example of an operational sequence of the content distribution system shown in FIG. 1.

FIG. 3 illustrates an operation processing example of an operation input unit in the content distribution system shown in FIG. 1.

FIG. 4 illustrates an operational example of the content distribution system.

FIG. 7A shows a former half of the example of the operational sequence of the content viewing system shown in FIG. 6.

FIG. 9A shows a former half of an example of an operational sequence of the content viewing system shown in FIG. 8.

DESCRIPTION OF EMBODIMENTS

Figure 1:
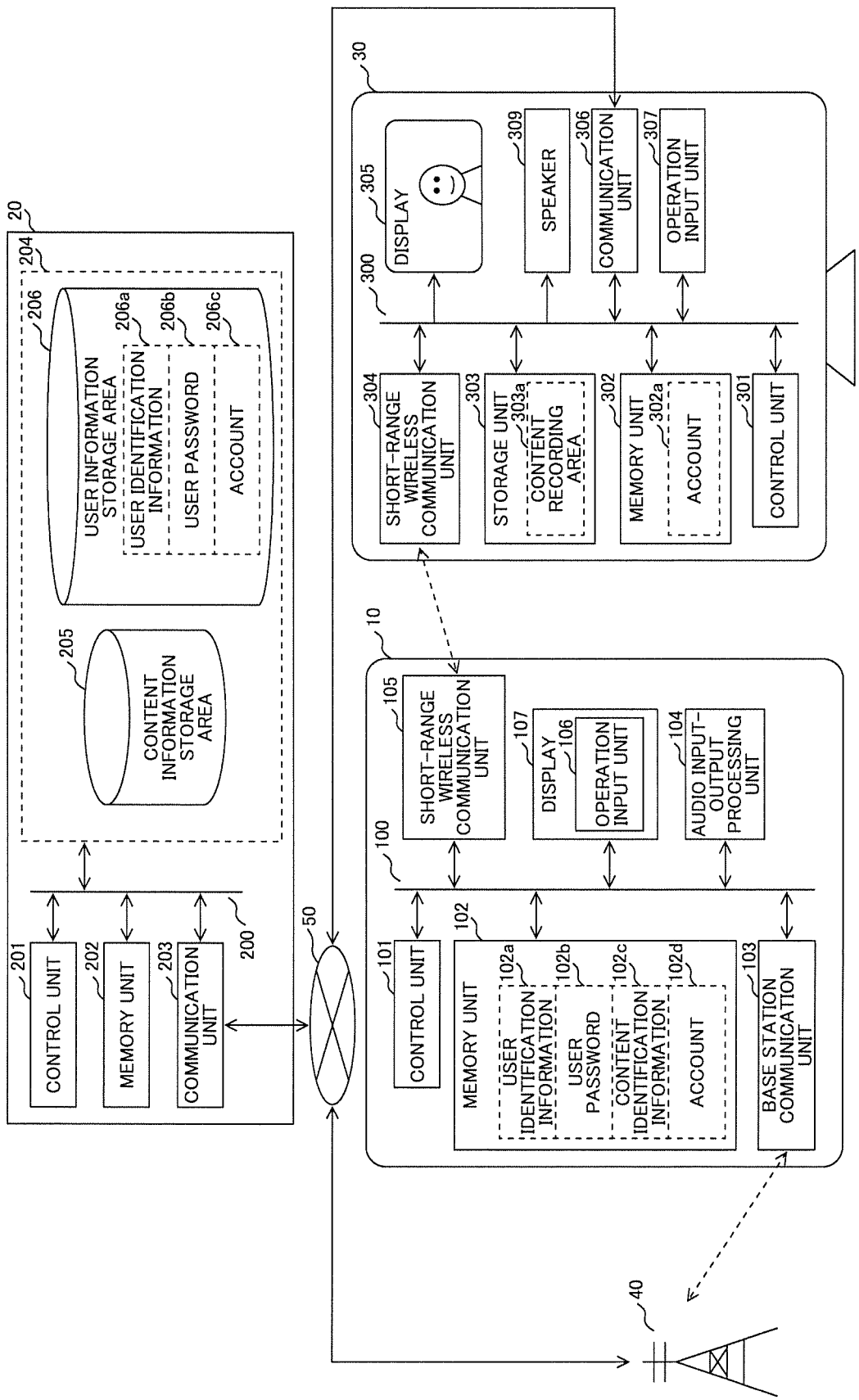
FIG. 1 is a block diagram showing an example of a configuration of a content distribution system.

Embodiments of the present invention will be described referring to the drawings below. In the following configurations of the present invention, the same reference numeral is used for the same part or a part having the similar function in common among different figures and duplicate description may be omitted.

Description of "first", "second", "third", and the like in this specification is allocated to identify components and a number, order or contents are not necessarily limited. In addition, a reference numeral for identifying a component is used for every context and a reference numeral used in one context does not necessarily denote the same configuration in another context. Moreover, a component identified by a certain reference numeral is prevented from also having a function of a component identified by another reference numeral.

A summary of technique described in the embodiments will be first explained. One of the embodiments relates to a content distribution system in which a content distribution server, a mobile information terminal, and a viewing device are connected via a network. The mobile information terminal transmits user identification information and a user password to the content distribution server and the content distribution server authenticates the mobile information terminal on the basis of the received user identification information and the received user password. The mobile information terminal transmits content identification information for identifying a viewing-desired content program and an account issue request to the content distribution server, the content distribution server issues an account including the content identification information on the basis of the received content identification information and the received account issue request, and the content distribution server transmits the issued account to the mobile information terminal. The mobile information terminal transmits the received account to the viewing device by short-range wireless communication, the viewing device transmits a content program viewing request to the content distribution server together with the received account, and the content distribution server distributes the content program to the viewing device on the basis of the account for the viewing request. The viewing device a member of the content distribution system having a characteristic that the viewing device enables viewing of the distributed content program. In addition, in an applied embodiment of this system, a mobile information terminal continuously transmits an account by short-range wireless communication and a viewing device interrupts viewing of the content when reception of the account transmitted from the mobile information terminal is interrupted.

Another embodiment relates to a content viewing system configured by broadcast-side equipment provided with a content program distribution server, a mobile information terminal, and a viewing device. The mobile information terminal transmits user identification information and a user password to the content distribution server and the content distribution server authenticates the mobile information terminal on the basis of the received user identification information and the received user password. The mobile information terminal transmits a viewing-desired broadcast content program or content identification information for identifying a broadcast channel and an account issue request to the content distribution server, the content distribution server issues an account including key information required for decrypting the broadcast content program or the broadcast channel on the basis of the received content identification information and the received account issue request, and the content distribution server transmits the issued account to the mobile information terminal. The mobile information terminal transmits the received account to the viewing device by short-range wireless communication and the broadcast-side equipment transmits the broadcast content program or the broadcast channel and encrypted related information including a scrambling key for decrypting the broadcast content program or the broadcast channel. The viewing device decrypts the related information by key information included in the account received from the mobile information terminal, decrypts the broadcast content program or the broadcast channel using the scrambling key extracted by decrypting the related information, and enables viewing of the broadcast content program or the broadcast channel.

The abovementioned content program is not necessarily required to be a unit of one program and may also be one channel unit or one category or a unit of a group. According to the technique described in the embodiments, a user can acquire an account for viewing on the mobile information terminal and transplants the account to a viewing device provided with a function that outputs images and audio if necessary so as to enable viewing of a content on the viewing device. In addition, the mobile information terminal and the viewing device detect that they exist in close positions owing to continuous reception verification of an account and can control interruption and resumption of reproducing the content. In this case, "continuous" is a concept including both continuous reception on the receive side and reception at a predetermined cycle. Moreover, the transmit side may also perform either of continuous transmission or transmission at a predetermined cycle. The details will be described below.

Example 1

(1. Whole Configuration)

FIG. 1 is a block diagram showing one example of a content distribution system according to this embodiment. The example shown in FIG. 1 is configured suitably using a mobile information terminal 10, a content distribution server 20, a viewing device 30, a base station 40, and an external network 50.

The mobile information terminal 10 communicates with the base station 40 by wireless telecommunication such as Wideband Code Division Multiple Access (W-CDMA) and Global System for Mobile communications (GSM)(trademark) and transmits user identification information 102a and a user password 102b respectively set and stored in the mobile information terminal 10 to the content distribution server 20 via the external network 50.

The content distribution server 20 collates the user identification information 102a, the user password 102b respectively received and user identification information 206a, a user password 206b respectively registered as a user beforehand, and authenticates the mobile information terminal 10 as a user. In addition, the content distribution server 20 issues an account including identification information of the already registered rental viewed content program(s) by a fee-based contract, and the like and being information that enables rental on the basis of a user authentication result, and transmits it to the mobile information terminal 10.

The mobile information terminal 10 transmits the received account to the viewing device 30 by short-range wireless communication such as an RFID tag. In this case, when a user holding the mobile information terminal 10 approaches a viewable range in the viewing device 30 desired by the user, the viewing device 30 receives the account. In addition, the viewing device 30 transmits the received account to the content distribution server 20 via the external network 50 and receives a rental content program desired by the user from the content distribution server 20.

Next, each configuration of the mobile information terminal 10, the content distribution server 20, and the viewing device 30 will be described.

(2. Configuration of Mobile Information Terminal)

The mobile information terminal 10 is configured suitably using a control unit 101, a memory unit 102, a base station communication unit 103, an audio input-output processing unit 104 including a microphone and a speaker, a short-range wireless communication unit 105, an operation input unit 106, and a display 107, and each component is mutually connected via a bus 100.

The control unit 101 is configured by a central processing unit (CPU), and the like and controls each component so as to execute various processing by executing a program stored in the memory unit 102. The memory unit 102 is a flash memory, and the like, and stores various programs used by the control unit 101 and data such as the user identification information 102a and the user password 102b each setting of which is input in the operation input unit 106, content identification information 102c and further, an account 102d received from the content distribution server 20.

The base station communication unit 103 is a communication interface that executes wireless telecommunication with the base station 40 such as W-CDMA and GSM. Hereby, the base station communication unit connects with the external network 50 via the base station 40 and transmits/receives information such as the user identification information 102a, the user password 102b, the content identification information 102c and the account 102d.

The operation input unit 106 is an electrostatic capacitance touchpad type input means for example and detects approach or contact operation (hereinafter called a touch) by a finger, a touch pen, and the like as operational input. A user in possession of the mobile information terminal 10 can input and set the user identification information 102a and the user password 102b via the operation input unit 106 so as to acquire authentication that the mobile information terminal 10 is already registered in the content distribution server 20 as a user. In addition, the user can set a rental content program which the user desires to view according to menu selection, and the like. The display 107 displays video and images on a liquid crystal panel, and the like and is provided with the operation input unit 106 on its display screen.

The audio input-output processing unit 104 includes a microphone that inputs external audio and a speaker that outputs audio outside, and executes processing of input-output audio.

The short-range wireless communication unit 105 transmits/receives information data to/from the viewing device 30 in a range in which short-range wireless communication is possible by short-range wireless communication under control by the control unit 101. That is, the short-range wireless communication unit transmits the account 102d including content identification information transmitted from the mobile information terminal 10 to the viewing device 30.

The short-range wireless communication unit 105 communicates using an electronic tag in this embodiment. However, the present invention is not limited to this, and if only communication by wire is enabled when the mobile information terminal 10 is located close to the viewing device 30, short-range wireless communication may also be made using Bluetooth (trademark), Infrared Data Association (IrDA), Zigbee (trademark), Home Radio Frequency (HomeRF)(trademark) or wireless LAN (IEEE802.11a, IEEE802.11b, IEEE802.11g). A short range in this embodiment means distance between a user and a viewing device in viewing contents and is a concept contrastive with a communication system for a mobile phone, and the like. For example, the short range means distance of approximately 20 m or less.

(3. Configuration of Content Distribution Server)

The content distribution server 20 is configured suitably using a control unit 201, a memory unit 202, a communication unit 203 and a storage 204, and respective units are mutually connected via a bus 200.

The control unit 201 is configured by CPU, and the like and controls each component so as to execute various processing by executing a program stored in the memory unit 202.

The communication unit 203 is an interface for connecting to the external network 50, receives the user identification information 102a, the user password 102b and the content identification information 102c from the mobile information terminal 10 corresponding to network connection via the base station 40, and transmits the account 206c issued by the content distribution server 20 to the mobile information terminal 10. In addition, the communication unit 203 receives an account 302a from the viewing device 30 via the external network 50 and transmits a content program stored in a content information storage area 205 in the storage 204 to the viewing device 30.

The storage 204 is provided with the content information storage area 205 that stores content programs themselves, content identification information, as well as content accompanying information such as whether the content program is charged or not, and the like and a user information storage area 206 that stores the user identification information 206a and the user password 206b respectively registered as a user beforehand, the account 206c newly issued, and the like.

The content distribution server 20 collates the user identification information 102a and the user password 102b respectively from the mobile information terminal 10 and the registered user identification information 206a, the registered user password 206b in the abovementioned configuration. When they are coincident, the content distribution server authenticates the mobile information terminal 10 as a mobile user, issues the account 206c that enables distribution of a viewing-desired content program, records the account in the user information storage area 206, and transmits it to the mobile information terminal 10 via the communication unit 203.

In the meantime, the content distribution server 20 extracts the content program based upon content identification information included in the account 302a from the content information storage area 205 when the content distribution server receives the account 302a from the viewing device 30 via the communication unit 203, and distributes the content program to the viewing device 30 via the communication unit 203 and the external network 50.

(4. Configuration of Viewing Device)

The viewing device 30 is configured suitably using a control unit 301, a memory unit 302, a storage unit 303, a short-range wireless communication unit 304, a display 305, a communication unit 306, and an operation input unit 307.

The control unit 301 is configured by CPU, and the like, and controls the whole viewing device 30 according to an operating system, various application programs, and the like respectively stored in the memory unit 302.

In addition, the memory unit 302 stores the account 302a received by the short-range wireless communication unit 304. A bus 300 is a data transmission channel for data transmission/reception between the control unit 301 and each component in the viewing device 30.

The storage unit 303 stores the content program received from content distribution server 20. In addition, the communication unit 306 transmits and receives data to/from the external network 50 such as the Internet by wired LAN or wireless LAN and downloads the content program from the content distribution server 20 via the external network 50. At this time, the downloaded content is stored in a content recording area 303a in the storage unit 303.

The operation input unit 307 is an instruction input unit for inputting an operational instruction to the viewing device 30 and in this embodiment, is suitably configured using operation keys such as a bottom switch.

The display 305 is a display device such as a liquid crystal panel and displays the content program received via the communication unit 306 or the content program stored in the storage unit 303. When the content program is read from the storage unit 303 and is viewed, the content program can be viewed without causing temporary interruption of viewing by retarding reading from the storage unit 303 by time enough to dissolve interruption and delay of content distribution even if the temporary interruption and delay of content distribution are caused because of congestion of the external network 50, and the like in distributing content data in the external network 50.

Owing to the abovementioned configuration, the user registered in the content distribution server beforehand can view the viewing-desired content program rental from the content distribution server on the freely selected viewing device located close to the user anywhere and on any viewing device using the mobile information terminal in possession of the user, and usable content program viewing environment can be acquired.

(5. Operation of Content Distribution System)

Next, an operational example of the content distribution system will be described.

Figure 2B:
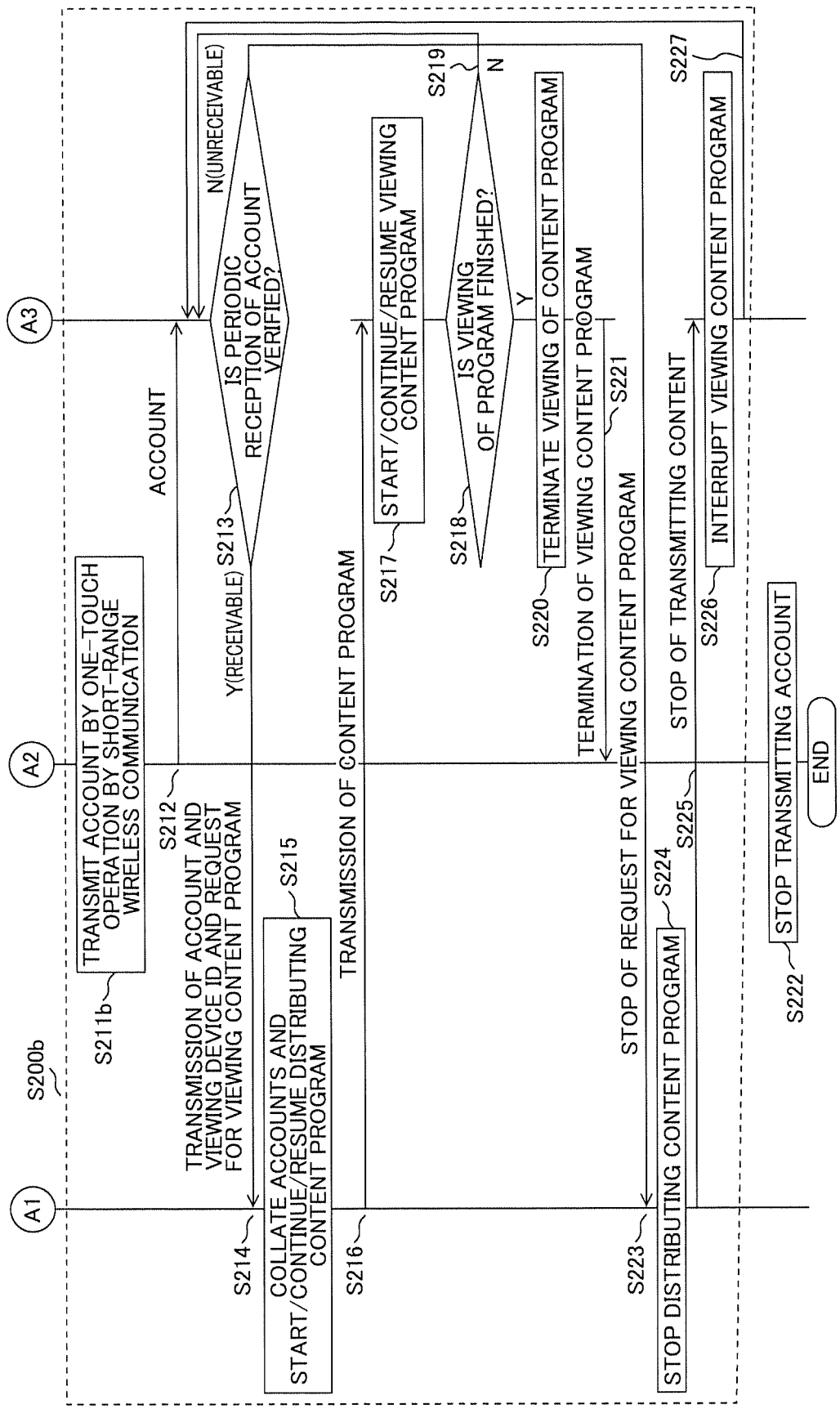
FIG. 2B shows a latter half of the example of the operational sequence of the content distribution system shown in FIG. 1.

FIGS. 2A and 2B show one example of an operational sequence of the content distribution system shown in FIG. 1. First, as shown in FIG. 2A, a user makes a request for a rental viewing-desired content program using a button, a menu screen, and the like of the operation input unit 106 on the mobile information terminal 10 (S201). A unit of rental contents is arbitrary in units of a channel and a program.

Hereby, the mobile information terminal 10 accesses the content distribution server 20 from the base station communication unit 103 via the base station 40 and the external network 50, requests and acquires log-in screen information (S202).

The mobile information terminal 10 displays a log-in screen on the display 107 and the user inputs user identification information 102a and a user password 102b as log-in information via the operation input unit 106 (S203).

The mobile information terminal 10 transmits the user identification information 102a and the user password 102b respectively input and stored to the content distribution server 20 via the external network 50 (S204).

The content distribution server 20 collates the user identification information 206a, the user password 206b respectively stored in the user information storage area 206 in the storage 204 as user information registered as a charged contract, and the like and the user identification information 102a, the user password 102b respectively transmitted from the mobile information terminal 10, authenticates that the user in possession of the mobile information terminal 10 is a normal registered user (S205), and transmits a user authentication result to the mobile information terminal 10 (S206).

The user inputs a viewing-desired content program via the operation input unit 106 after the user verifies reception of the user authentication result from the content distribution server 20 on the mobile information terminal 10, and stores the input content program in the memory unit 102 as content identification information 102c (S207). Afterward, the mobile information terminal 10 transmits the input content identification information to the content distribution server 20 via the base station communication unit 103 and the external network 50 and requests issue of an account (S208). When the viewing-desired content program is uniquely specified at the time of the content renting request (S201), the input of the viewing-desired content program (S207) may also be omitted.

The content distribution server 20 receives a request for issuing content identification information and the account, issues the account including the content identification information after the content distribution server verifies that viewing of a content program corresponding to the content identification information is registered, and further, stores the issued account in the user information storage area 206 for example of the storage 204 as the account 206c (S209).

In addition, the content distribution server 20 transmits the issued account to the mobile information terminal 10 via the external network 50 and the base station 40 (S210). The mobile information terminal 10 stores the received account in the memory unit 102 as an account 102d (S211a).

According to the abovementioned account generation process, the content distribution server 20 authenticates the user using the user identification information and the user password respectively input and set on the mobile information terminal 10, issues the account as a result of authenticating renting for viewing the viewing-desired content program set on the mobile information terminal 10, and the mobile information terminal 10 can receive and store the account transmitted from the content distribution server 20 (S200a). However, order of the steps S201, S203, S207 executed by the mobile information terminal 10 is not limited to the order shown in FIG. 2A, the order may also be changed, and the steps may also be simultaneously executed.

Next, as shown in FIG. 2B, when the user closely holding the mobile information terminal 10 approaches the viewing-desired viewing device 30 for example and the user performs simple one-touch input operation on the operation input unit 106, the mobile information terminal 10 starts transmission of an account 102d by short-range wireless communication in the short-range wireless communication 105 (S211b). The transmitted account 102d is transmitted to the viewing device 30 existing in the vicinity of the mobile information terminal (S212). As for the mobile information terminal 10, operation such as start, continuation, interruption and resumption of transmission of an account may also be enabled.

When plural viewing devices exist in the vicinity of the mobile information terminal, only the viewing-desired viewing device has to be made in a waiting state for reception of the account by operation in advance of the user. For example, only the viewing-desired viewing device 30 can be made in a waiting state for reception of the account by inputting and setting to/in the viewing-desired viewing device 30 using the operation input unit 307 so that the short-range wireless communication unit 304 is ready to receive the account. The viewing device 30 periodically performs processing for discriminating whether the account 102d transmitted from the mobile information terminal by short-range wireless communication exists in a receivable close range and can be received or whether the account 102d exists outside the receivable vicinity and cannot be received at a certain interval (S213). The period may also be set to every 10 seconds to 30 minutes for example. However, the user may also arbitrarily select in a predetermined range.

When the viewing device 30 can receive the account 102d, the viewing device 30 transmits an account 302a received and stored from the mobile information terminal and stored and viewing device ID for specifying the viewing device 30 to the content distribution server 20 from the communication unit 306 via the external network 50, and requests viewing of the desired rental content program (S214).

When the content distribution server 20 collates the received account 302a and the issued account 206c stored in the storage 204 and verifies that they are coincident, the content distribution server reads the content program fitted to viewing-desired content identification information included in the received account 302a from the content information storage area 205 and enables the content program to be distributed (S215), and transmits the distributable content program to the viewing device 30 specified on the basis of the viewing device ID (S216).

In the viewing device 30, the content program distributed from the content distribution server 20 can be viewed via the display 305 and the speaker 309 (S217). In addition, it is discriminated whether the distributed content program is finished or not (S218) and when distribution of the content program to the viewing device is not finished, the abovementioned periodic verification of account reception is repeated (S219). The viewing device 30 can verify that a user having a suitable authorization of viewing is located in short distance, that is, in a viewable range by continuing monitoring of an account by short-range wireless communication.

When distribution of the content program to the viewing device is finished, viewing the program is finished (S220) and information showing an end of the viewing program is transmitted to the mobile information terminal 10 from the viewing device 30 (S221). At this time, the viewing device 30 deletes the account 302a stored in the memory unit 302 in itself. The mobile information terminal 10 receives the end of viewing the content program, stops transmission of the account 102d to the viewing device 30 (S222), and terminates the content viewing on the viewing device by renting the account.

In the meantime, when the viewing device 30 cannot receive the account 102d from the mobile information terminal 10, the viewing device 30 stops the request for viewing the renting-desired content program to the content distribution server 20 from the communication unit 306 via the external network 50 (S223). The content distribution server 20 receives the stop of the request for viewing the content program and executes processing for stopping distribution of the content program (S224). The viewing device 30 interrupts providing the content program (S226) according to the stop of transmitting the content program (S225) and returns to processing for repeating the periodic verification of receiving an account (S227).

When the viewing device 30 receives an account again during the periodic verification of receiving an account (S213), the viewing device requests viewing of a renting-desired content program again (S214). Hereby, distribution of the program is resumed. However, when predetermined time, for example one hour, elapses since the last account reception, the viewing device judges that the user does not return any longer and deletes the account 302a stored in the memory unit 302 in itself. Processing for deleting the account 302a in the viewing device 30 is also similar in another embodiment.

According to the content viewing process by the above-mentioned transmission/reception of the account, the viewing device starts/continues/interrupts/resumes viewing of the viewing-desired content program distributed from the content distribution server according to a result of the periodic verification of receiving an account from the mobile information terminal (S200b).

Consequently, there is produced effect that when the user closely holding the mobile information terminal 10 exists in the vicinity of the viewing device 30, the user transmits the account by short-range wireless communication by the simple one-touch input operation on the mobile information terminal and the viewing device 30 can receive the account from the mobile information terminal by short-range wireless communication, the user can view the renting/viewing-desired content program distributed from the content distribution server on a viewing device close to the user anywhere.

In addition, when the user holding the mobile information terminal separates from the viewing device, the viewing device identifies that the user separates because reception of the account is impossible, stops distribution of the content, and can temporarily interrupt (pause) viewing of the distributed content program on its screen. Afterward, when the user holding the mobile information terminal approaches the vicinity of the viewing device again, the viewing device can resume the viewing of the content program because the reception of the account is turned possible, and therefore, the user can acquire effect that the start/the continuation/the resumption of viewing the content program are usably enabled by the simple one-touch operation.

When the user temporarily separates from the viewing device without having the mobile information terminal and interrupts viewing the content program halfway even if the viewing device is located in a close range that enables receiving the account from the mobile information terminal, the user inputs and sets interruption of viewing via the operation input unit 106 and may also stop transmission of the account 102d from the short-range wireless communication unit 105. Further, when the user returns to the vicinity of the viewing device, the user inputs and sets resumption of viewing via the operation input unit 106 of the mobile information terminal and has only to resume transmission of the account 102d from the short-range wireless communication unit 105. In this case, usable usage environment can also be realized for a user not holding a mobile information terminal by setting the interruption and the resumption of viewing the content program by himself/herself in addition to control over viewing a content program depending upon transmission/reception of the account from the mobile information terminal.

(6. Operational Screen Example of Mobile Information Terminal)

FIG. 3 shows a screen display example in operation on the operation input unit 106 of the mobile information terminal 10. A display screen 106a is a display screen example when a request for renting a viewing-desired content is made to the content distribution server 20 by selecting the renting request using a functional menu, and the like of the mobile information terminal 10 and clicking a displayed START button (S201). Hereby, log-in screen information can be requested and acquired (S202).

Display screens 106b, 106c are display screen examples when user identification information (ID) and a user password are next input according to an operation input menu of the mobile information terminal 10 on the basis of acquisition of the log-in screen information transmitted from the content distribution server 20.

A display screen 106d is a display screen example when a viewing-desired content program is selected and set on the mobile information terminal 10 after the content distribution server 20 collates the user identification information and the user password, authenticates the user and the mobile information terminal 10 receives an authentication result. The display screen is the example in a case where a category such as a movie and a drama of contents is selected and further, a viewing-desired content program is selected and set in a detailed menu (not shown). However, the present invention is not limited to this, and a viewing-desired content program has only to be selected and set by inputting a viewing-desired content program name for example. In addition, the registered user may also make the content programs the viewing of which is contracted beforehand displayed and may also select out of them.

A display screen 106e is a display screen example showing that the mobile information terminal 10 receives an account including content identification information issued by the content distribution server 20 to the user by display of RECEIVED. Hereby, the user closely holding the mobile information terminal 10 can recognize that transmission of the account to the viewing device 30 is enabled.

A display screen 106f is a display screen in a case where the account is transmitted to the viewing device 30 when the user in the vicinity of the viewing device 30 for the user closely holding the mobile information terminal 10 to view the viewing-desired content program clicks a displayed START button after RECEIVED is displayed on the display screen 106e. Hereby, the account can be transmitted to the viewing device 30 from the mobile information terminal 10 by one-touch operation and when the viewing device 30 can receive the account, the viewing-desired content program can be viewed on the viewing device 30. In addition, when the user closely holding the mobile information terminal 10 separates from the viewing device 30 and the viewing device 30 cannot receive the account, viewing of the content program can be interrupted (paused) at that time, and when the user approaches the viewing device 30 again afterward and the viewing device can receive the account, viewing of the content program can be resumed. Moreover, in a case where the user once separates from the viewing device without having the mobile information terminal and once interrupts the viewing of the content program on the viewing device, interruption of viewing is enabled when the user clicks a STOP button on the display screen 106f even if the mobile information terminal is located in the vicinity of the viewing device. Hereby, transmission/reception of the account to/from the viewing device 30 on the mobile information terminal 10 in the vicinity of the viewing device can be controlled by one-touch operation and while the account can be received, the viewing-desired content program can be viewed on the viewing device 30.

In the one-touch transmission (S211b) of the account by short-range wireless communication, transmission by the mobile information terminal 10 can be made intermittent by periodically transmitting per predetermined time in synchronization with periodic reception verification timing in the viewing device 30, and effect that power consumption of the mobile information terminal can be greatly reduced is acquired.

(7. Example of Relay Viewing)

Next, a case where viewing is interrupted in a certain viewing device 30 and is continued relaying the viewing to another viewing device will be described.

FIG. 4 shows an example explaining operation for relay viewing in which viewing of a content program is started in a viewing device 31 having the similar configuration to that of the viewing device 30, the viewing in the viewing device 31 is interrupted (paused) during rental viewing, a user moves to another viewing device 32 having the similar configuration to that of the viewing device 30 holding the mobile information terminal 10, the user repeats interruption/resumption of viewing the content program by performing rental viewing operation and the user views the content program, relaying the content program between the plural viewing devices.

As shown in FIG. 4, (a) shows an image when a user starts to view the content program on the viewing device 31 using the mobile information terminal 10 in a home A provided with the viewing device 31, afterward, the user moves to a home B provided with the viewing device 32 and further, the user resumes viewing the content program on the viewing device 32. (b) shows a position of the user holding the mobile information terminal 10. (c) shows a state of transmission/reception of an account from the mobile information terminal to the viewing device. It is an account from the mobile information terminal to the viewing device, an interruption flag or an interruption position pointer that are transmitted/received. (d) shows a state of reviewing of the content program.

As shown in (a), (b), the user approaches the viewing device 31 in the home A, performs an account generation process (S200a), and further, performs one-touch transmission operation (S211b) of the account by short-range wireless communication. Hereby, when the transmission/reception of the account is made between the mobile information terminal 10 and the viewing device 31 as shown in (c), the content program can be viewed on the viewing device 31 in the home A as shown in (d). These processing is similar to the processes S200a, S200b shown in FIGS. 2A, 2B.

Afterward, when the user moves from the home A to the home B, holding the mobile information terminal 10, a moving course is outside a transmission/reception range of the account (S240) as shown in (b), (c), (d), the transmission/reception between the mobile information terminal 10 and the viewing device 31 of the account is turned impossible, and viewing of the content program is interrupted. Or the viewing of the content program is similarly interrupted by stopping transmission of the account (S240) by operation of the STOP button on the display screen 106f of the mobile information terminal 10.

In addition, the viewing device 31 transmits a viewing interruption position of the content program, an interruption flag showing viewing interruption time or an interruption pointer to the mobile information terminal 10 when the viewing is interrupted and the mobile information terminal 10 stores the received interruption flag or the received interruption pointer in the memory unit 102. Viewing position information showing a viewing position of the content program is continuously transmitted/received between the mobile information terminal 10 and the viewing device 31 and when viewing is interrupted, the viewing position information may also be stored in the memory unit 102 as the interruption flag or the interruption pointer.

Further, as shown in (a), (b), when the user moves to the home B, approaches the viewing device 32 and enters the transmission/reception range of the account (S241), the transmission/reception of the account is made again between the mobile information terminal 10 and the viewing device 32 and the viewing of the content program can be resumed on the viewing device 32 in the home B as shown in (c), (d). Or after the user approaches the viewing device 32 in the home B and enters the transmission/reception range of the account, the viewing of the content program can be similarly resumed by resuming the transmission of the account once stopped by operating the START button on the display screen 106f of the mobile information terminal 10 (S241). In S241 being the processing when the viewing is resumed, as the user already stores information of the account in the mobile information terminal 10, the process S200a shown in FIG. 2A is not required and S241 is basically similar to the process S200b shown in FIG. 2B. However, as the viewing is resumed on the way of the content program, the following processing is included.

The mobile information terminal 10 transmits the interruption flag or the interruption pointer respectively stored in the memory unit 102 of the mobile information terminal 10 to the viewing device 32 and the viewing device 32 resumes the reception of the content program from the content distribution server 20 from the viewing interruption position on the basis of the received interruption flag or the received interruption pointer. At this time, when the interruption flag or the interruption pointer is stored in the memory unit 102, the mobile information terminal 10 may also continuously transmit the account to which the interruption flag or the interruption pointer is added. Or the interruption flag or the interruption pointer is added separately from the account and may also be continuously transmitted. Or, though the following timing is not shown, the interruption flag or the interruption pointer may also be transmitted at timing at which the mobile information terminal 10 receives a response from the viewing device 32 that verifies reception of the account.

Therefore, the viewing devices are taken over by transmitting/receiving the account, the interruption flag or the interruption pointer respectively from the mobile information terminal to the viewing device by the simple one-touch operation using the mobile information terminal and relay viewing of the content program can be realized until the viewing of the content program is finished.

For an example when no interruption flag or no interruption pointer is used, relay viewing of the content program may also be consecutively made on another viewing device by storing an interrupted position of the viewing-interrupted program in the storage 204 of the content distribution server 20 when transmission of the content program from the content distribution server 20 to the viewing device 31 is interrupted and afterward, resuming the distribution on the other viewing device from the interrupted position of the program stored in the storage 204 according to a request from the other viewing device 32 for resuming the viewing of the content program the viewing of which is interrupted.

Example 2

Figure 5:
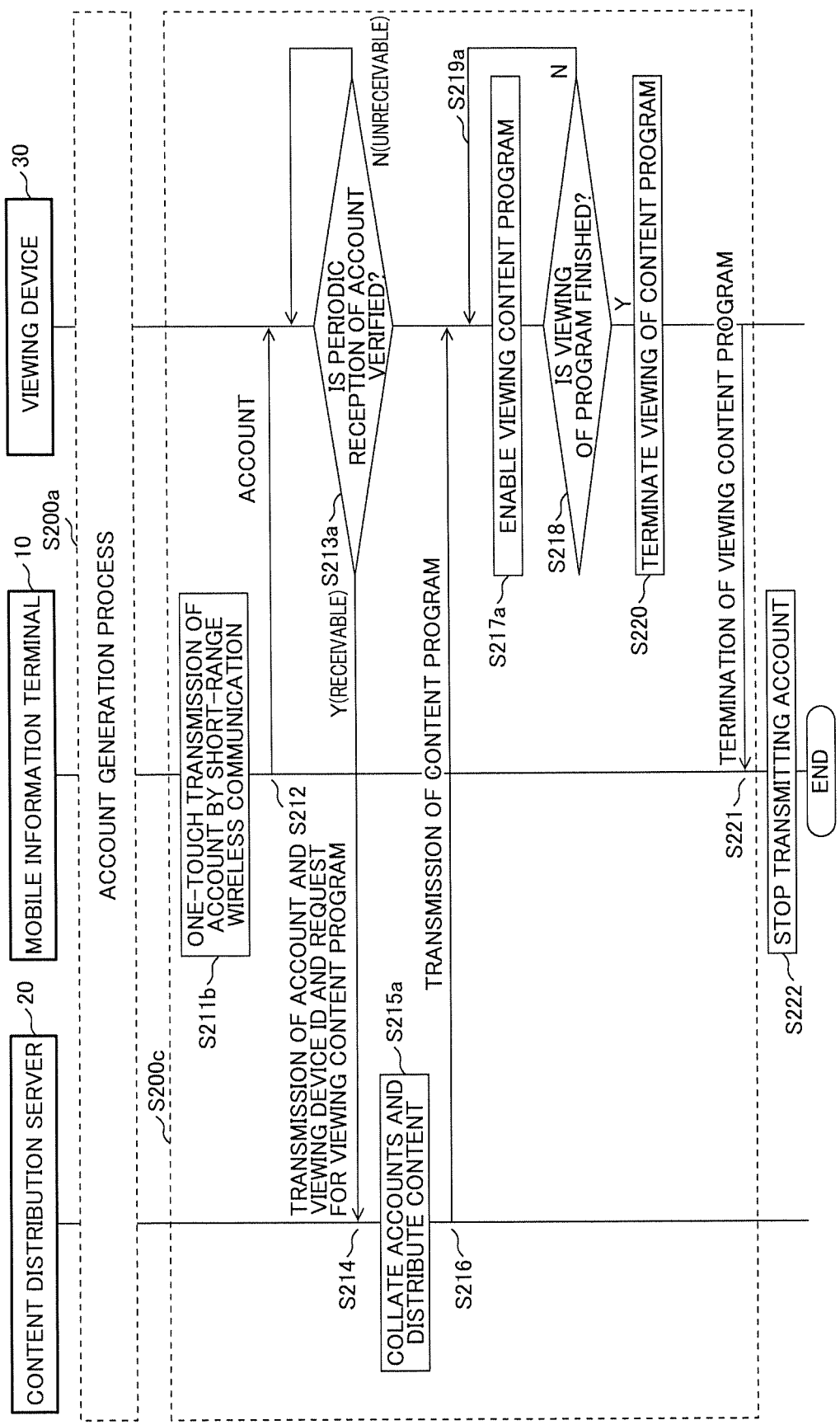
FIG. 5 shows an example of another operational sequence of the content distribution system shown in FIG. 1.

FIG. 5 shows another example of an operational sequence of the content distribution system shown in FIG. 1. As in FIG. 5, each sequential part which is shown in FIGS. 2(a), 2(b) and to which the same reference numeral is allocated has the same operation as the operation already described referring to FIGS. 2(a), 2(b), detailed description of them is omitted.

In FIG. 5, an account generation process (S200a), one-touch transmission operation of an account by short-range wireless communication (S211b), and transmission of the transmitted account to a viewing device 30 (S212) are as described referring to FIGS. 2(a), 2(b). A mobile information terminal 10 transmits an account 102d to the viewing device 30 by one-touch click operation on the mobile information terminal 10 of a user.

The viewing device 30 periodically verifies reception of the account 102d at a certain fixed interval (S213a). The periodic verification of reception is continued until the viewing device 30 receives the account 102d transmitted from the mobile information terminal 10 by short-range wireless communication by approach of the mobile information terminal 10 to the viewing device 30 (S213a).

When the viewing device 30 can once receive the account 102d, the viewing device 30 transmits the received and stored account 302a to a content distribution server 20 from a communication unit 306 via an external network 50 and requests viewing of a renting-desired content program (S214).

The content distribution server 20 collates the received account 302a and an issued account 206c stored in a storage 204, enables reading a content program fitted to viewing-desired content identification information included in the received account from a content information storage area 205 and distributing the content program (S215a) when the accounts are coincident, and transmits the content program to the viewing device 30 to an end of the program (S216).

On the viewing device 30, the content program distributed from the content distribution server 20 is viewed via a display 305 and a speaker 309 (S217a). In addition, the viewing device 30 continues viewing of the content program until distribution of the content program to the viewing device is finished by discriminating processing (S218) of whether the distributed content program is finished or not (S219a), and terminates the viewing of the program together with an end of the distribution of the content program to the viewing device (S220).

After the viewing of the content program is finished, the viewing device 30 transmits information showing the end of the viewing program to the mobile information terminal 10 (S221), the mobile information terminal 10 receives the end of the viewing of the content program, and stops the transmission of the account to the viewing device 30 (S222). The viewing device periodically verifies the reception of the account from the mobile information terminal by the above-mentioned content viewing process by the transmission/reception of the account and when the viewing device receives the account, the viewing device enables a user to view the viewing-desired content program distributed from the content distribution server (S200c).

Even if a person except the user goes out with the mobile information terminal 10 for example after the user closely holds the mobile information terminal 10 and starts to view a content program in the vicinity of the viewing device 30, the mobile information terminal 10 is separated from the viewing device 30 and the viewing device 30 cannot receive the account 102d from the mobile information terminal 10, the user can view the content program to the end.

Example 3

Next, an example not in a case where a registered content program transmitted from a content distribution server via an external network is rented and viewed but in a case where a registered content program broadcast using a radio wave according to a fee-based contract is viewed on a viewing device in the vicinity of a mobile information terminal will be described.

Figure 6:
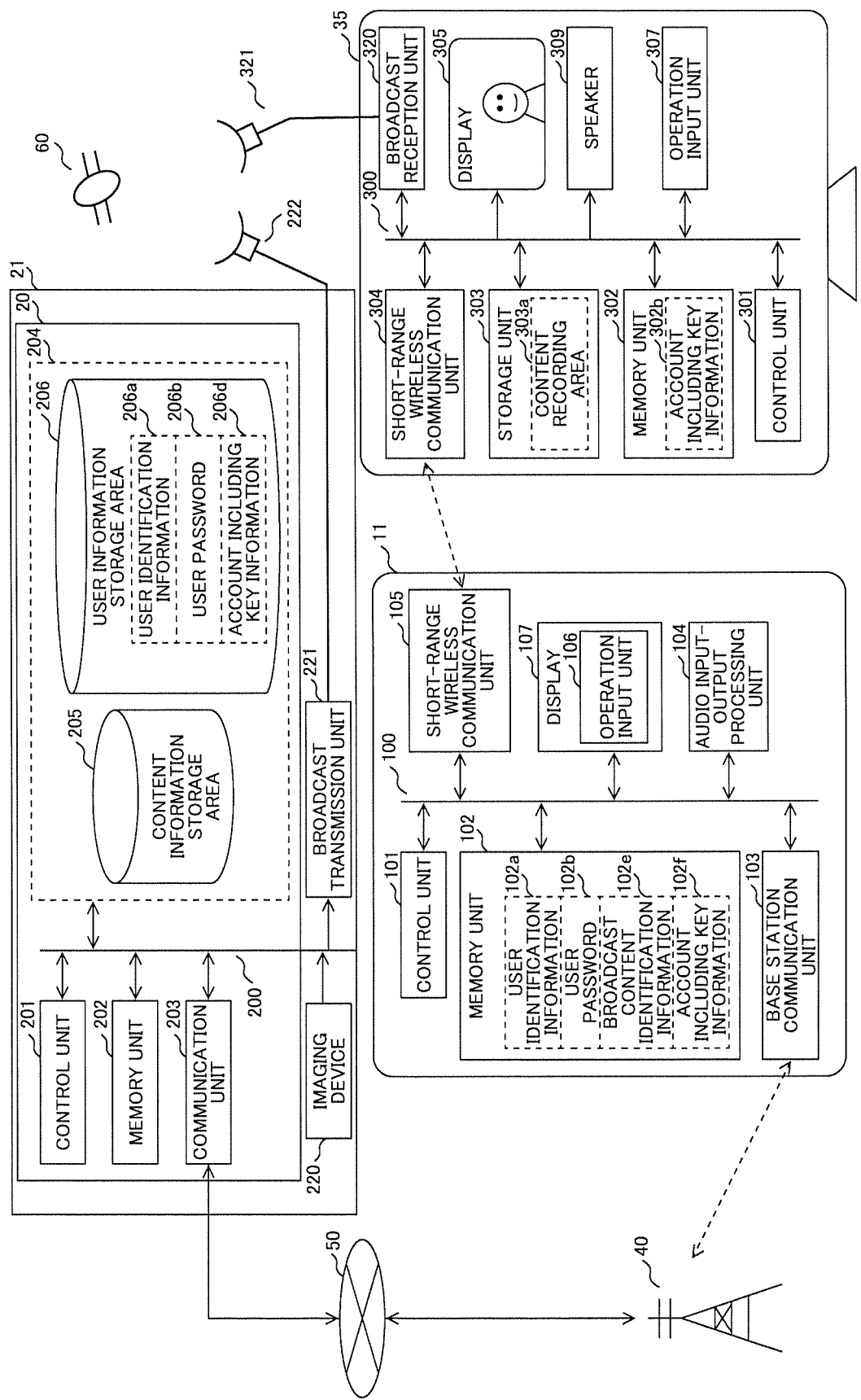
FIG. 6 is a block diagram showing an example of a configuration of a content viewing system.

FIG. 6 is a block diagram showing one embodiment of a content viewing system according to this embodiment. To explain the difference from the configuration shown in FIG. 1, the mobile information terminal 10 shown in FIG. 1 is replaced with a mobile information terminal 11 in FIG. 6, the mobile information terminal 11 stores broadcast content identification information 102e in place of the content identification information 102c, and the mobile information terminal 11 stores an account 102f including key information in place of the account 102d.

A content distribution server 20 is included or annexed in/to broadcast-side equipment 21. The broadcast-side equipment 21 is equipped with an imaging device 220, a broadcast transmission unit 221, and a transmission antenna 222. In addition, a user information storage area 206 is equipped with an account 206d including key information in place of the account 206c shown in FIG. 1.

A viewing device 35 in place of the viewing device 30 shown in FIG. 1 is equipped with a broadcast reception unit 320 and a reception antenna 321, and a memory unit 302 stores an account 302b including key information. The communication unit 306 shown in FIG. 1 is not required. In addition, the broadcast-side equipment 21 and the viewing device 35 communicate via a broadcasting satellite 60. In FIG. 6, the same reference numeral is allocated to the same processing unit as that in the embodiment shown in FIG. 1 and description of them is omitted.

In the broadcast-side equipment 21, the imaging device 220 is configured by a camera, and the like and generates a real-time content program for a broadcast. After the broadcast transmission unit 221 converts a content program for a broadcast from the imaging device 220 and a content program from the content distribution server 20 to a video signal and an audio signal, the broadcast transmission unit sequentially executes encode processing such as digital encoding and data compression, multiplexing processing of (generating a transport stream (TS)) of video data and audio data, further, encryption processing of the transport stream (TS), error correcting code (Reed-Solomon Coding) adding processing and digital modulation processing, and the broadcast transmission unit generate transmit information data. The broadcast information data generated by the broadcast transmission unit 221 is supplied to the transmission antenna 222.

The broadcast satellite 60 receives transmission information data transmitted from the transmission antenna 222 as a radio wave and retransmits the transmission information data to the reception antenna 321.

In the viewing device 35, the broadcast reception unit 320 sequentially applies digital demodulation processing, error correcting processing, further, processing for decrypting and decoding the transport stream (TS), demultiplexing processing into video data and audio data and decoding processing of each of video and audio respectively to a radio wave received via the reception antenna 321, and the broadcast reception unit decodes the content program to a video signal and an audio signal. A display 305 displays the decoded video signal on its screen, a speaker 309 reproduces the decoded audio signal as audio and a user can view the broadcast content program.

As shown in FIG. 6, as in the description of the embodiment shown in FIG. 1, the mobile information terminal 11 acquires an account from the content distribution server 20. However, the mobile information terminal 11 transmits broadcast content identification information 102e showing a viewing-desired broadcast content program input and set to the broadcast-side equipment 21 via an external network 50 and requests issue of an account including key information required for decrypting the broadcast content program the viewing of which is registered.

The transmission-side equipment 21 receives the account issue request, issues and stores the account 206d including the key information, and transmits the account to the mobile information terminal 11 via the external network 50. The mobile information terminal 11 transmits the received and stored account 102f to the viewing-desired viewing device 35 in the vicinity of the mobile information terminal 11 by short-range wireless communication.

When a user closely holding the mobile information terminal 11 is located in a range in which the user can view on the viewing device 35 and the viewing device 35 receives the account 102f from the mobile information terminal 11 by short-range wireless communication, the viewing device 35 stores the account 102f received in the memory unit 302 as an account 302b. In addition, the broadcast reception unit 320 in the viewing device 35 executes processing for decrypting and decoding the encrypted and received transport stream (TS) by a broadcast using the key information received as the account 302b, reproduces a video signal and an audio signal, and enables viewing the rented viewing-desired content program on the display 305 and via the speaker 309.

In the abovementioned example, the key information received as the account 302b is directly used for a scrambling key for decrypting the broadcast content program in the form of the transport stream (TS). However, a method other than this may also be adopted. For example, related information acquired by encrypting key information required for decrypting the content program is broadcast from the broadcast-side equipment 21 separately from the broadcast content program, the related information is decrypted by the key information received as the account 302b, and the key information extracted as a result of decrypting the related information may also be used for the scrambling key for decrypting the broadcast content program.

Further, plural pieces of related information may also be provided, for example, first and second related information are provided, the received first related information is decrypted by key information received as the account 302b, the second related information is decrypted by a first key extracted as a result of decrypting the first related information, and the broadcast content program may also be decrypted using a second key extracted as a result of decrypting the second related information for a scrambling key. That is, the extraction of each key information piece for decryption and the decryption are repeated for the broadcast plural pieces of related information and the broadcast content program may also be decrypted using the finally extracted key information for the scrambling key. In this case, security for protecting the content can be more enhanced by multiplexing ciphers.

Furthermore, in the abovementioned example, the case where the viewing contracted content program is input and set is described. However, a case of a contract per channel (broadcast station) is also similar. That is, in this case, the user inputs and sets a viewing contracted channel (broadcast station) to be viewed on the viewing-desired viewing device from the operation input unit 106 of the mobile information terminal 11 after the user receives user authentication. The mobile information terminal 11 has only to select broadcast-side equipment of a communication destination according to the input/set viewing-desired channel (broadcast station), transmit broadcast channel identification information showing the input/set viewing-desired broadcast channel to the selected transmission-side equipment as the broadcast content identification information 102e, and request issue of an account including key information required for decrypting the viewing registered broadcast channel. Afterward, an encrypted and received transport stream (TS) is decrypted and decoded after similar processing to the abovementioned processing, a video signal and an audio signal are reproduced, and viewing of the renting/viewing-desired broadcast channel on the display 305 via the speaker 309 is enabled.

Owing to the abovementioned configuration, a user who already registers a viewable broadcast content program or a viewable broadcast channel (broadcasting station) by a paying contract, and the like beforehand can view the viewing-desired content program or the broadcast channel rented via a broadcast wave on any freely selected viewing device in the vicinity of the user anywhere using the mobile information terminal held by the user, and user-friendly content viewing environment can be acquired. In the embodiment shown in FIG. 6, the case of satellite broadcasting using the broadcast satellite is described. However, it is evident that in a case of terrestrial digital broadcasting, the similar action and effect are also acquired.

Next, an operational example of the content viewing system shown in FIG. 6 will be described.

Figure 7B:
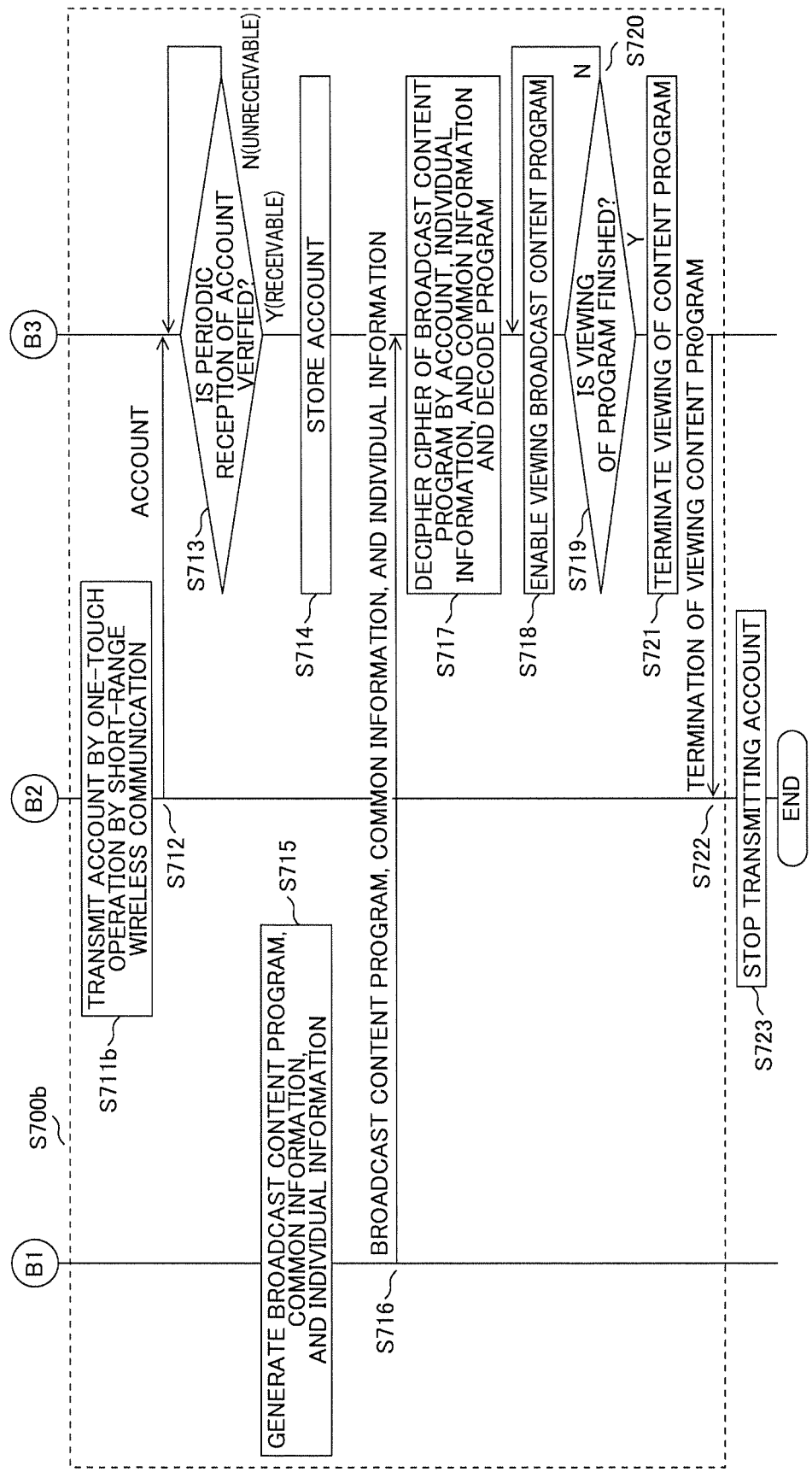
FIG. 7B shows a latter half of the example of the operational sequence of the content viewing system shown in FIG. 6.

FIGS. 7A and 7B show one example of an operational sequence of the content viewing system shown in FIG. 6. In FIG. 7, as each unit which is shown in FIGS. 2, 5 and to which the same reference numeral is allocated has the same operation as the operation already described in FIGS. 2, 5, detailed description of the operation is omitted.

FIG. 7A basically shows substantially similar processing to the processing shown in FIG. 2A. However, for a hardware configuration, the content distribution server 20 shown in FIG. 2A is replaced with the broadcast-side equipment 21, the mobile information terminal 10 is replaced with the mobile information terminal 11, and the viewing device 30 is replaced with the viewing device 35. In addition, for contents of processing, the content program distributed via the network in FIG. 2A is replaced with the broadcast content program distributed by broadcasting in FIG. 7A. Except them, steps S201 to S206 in FIG. 7A are similar to those in FIG. 2A.

Afterward, the mobile information terminal 11 transmits the input and stored broadcast content identification information 102e to the content distribution server 20 via a base station communication unit 103 and an external network 50 and requests issue of an account including key information required for decrypting the broadcast content information received on the viewing device 35 (S708).

After the content distribution server 20 receives the broadcast content identification information and the account issue request and verifies that viewing of the broadcast content program corresponding to the broadcast content identification information is registered, it issues an account including the broadcast content identification information and the key information and further, stores the issued account in a user information storage area 206 as an account 206d (S709).

In addition, the content distribution server 20 transmits the issued and stored account 206d to the mobile information terminal 11 via the external network 50 and a base station 40 (S710).

The mobile information terminal 11 stores the received account 206d in a memory unit 102 as an account 102f (S711a). In the abovementioned account generation process, the content distribution server 20 authenticates the user of the mobile information terminal 11 using the user identification information and the user password respectively input and set on the mobile information terminal 11, issues the account including the key information for enabling decoding of the broadcast content program the viewing of which is set on the mobile information terminal 11, and the mobile information terminal 11 can receive and store the account transmitted from the content distribution server 20 (S700a).

Next, as shown in FIG. 7B, when the user closely holding the mobile information terminal 10 approaches the viewing-desired viewing device 35 and further, performs simple one-touch input operation on the operation input unit 106, the mobile information terminal 11 starts to transmit the account 102f via the short-range wireless communication unit 105 by short-range wireless communication (S711b). The transmitted account 102f is transmitted to the viewing device 35 existing in the vicinity of the mobile information terminal (S712).

The viewing device 35 periodically performs discrimination processing of whether the account 102f transmitted from the mobile information terminal by short-range wireless communication exists in a receivable close range and can be received or whether the account 102f exists outside the receivable close range and cannot be received the account 102f at a fixed interval (S713).

When the viewing device 35 can receive the account 102f, the viewing device 35 stores the received account 102f in the memory unit 302 as an account 302b (S714). In broadcasting the content program, the broadcast-side equipment 21 generates and encrypts the content program, generates first related information (common information) acquired by uniting information related to control over the receiving viewing device and information of whether viewing is possible or not (for example, this program is a sport program and is fee-based) and second related information (individual information) for decrypting the common information (S715), and the broadcast-side equipment transmits them to the viewing device 35 (S716).

The common information and the individual information are both encrypted and transmitted. Then, the broadcast reception unit 320 first decrypts the individual information using the key information received from the mobile information terminal 11, extracts a first key (a work key) for decrypting the common information on the basis of the decoded individual information, next decrypts the common information using the first key (the work key), extracts a second key, and decrypts and decodes the broadcast content program itself using the extracted second key for a scrambling key (S717).

Therefore, the user can view a video signal and an audio signal of the decrypted and decoded broadcast content program on the display 305 via the speaker 309 (S718).

In addition, the viewing device discriminates whether the distributed content program is finished or not (S719), continues receiving distribution when distribution of the content program to the viewing device is not finished, continues viewing of the content program (S720), terminates viewing of the program when the distribution of the content program to the viewing device is finished (S721), and transmits information showing that the viewed program is finished to the mobile information terminal 11 (S722).

The mobile information terminal 11 receives the termination of viewing the content program, stops transmission of the account 102f to the viewing device 35 (S723), and terminates content viewing on the viewing device by account renting. For timing of stopping transmitting the account 102f from the mobile information terminal 11 to the viewing device 35, the present invention is not limited to the abovementioned timing after viewing of the content program is finished and if only timing is after viewing is started on the viewing device 35, it need scarcely be said that the stop of transmission is possible at any timing till an end of viewing. In this case, the mobile information terminal 11 stops transmission of the account by transmitting information showing the stop of the transmission of the account 102f from the viewing device 35 to the mobile information terminal 11 after viewing of the content program is started (S723).

According to the broadcast content viewing process by the abovementioned account transmission/reception, the viewing device periodically verifies reception of the account from the mobile information terminal, decrypts and decodes the viewing-desired broadcast content program broadcast from the broadcast-side equipment using key information included in the account when the viewing device receives the account, and the viewing of the broadcast content program to the end is enabled (S700b).

The case where the content program is rented and viewed in units of program is described above. However, when a content is rented and viewed in units of channel (broadcast station), it is evident that the similar action and effect are also acquired except viewing termination processing if only a request for renting/viewing is made to a unit of a channel of contents in place of the unit of the broadcast content program. That is, in the step S201, the unit of the content program has only to be replaced with the unit of the channel of contents, and in the steps S707, S709, S715, S716, S717, the broadcast content program has only to be replaced with a broadcast channel.

As for the viewing termination processing, the case of renting/viewing in units of content program is described above in the abovementioned example, processing for terminating renting/viewing is performed by the end of the content program. However, in a case of renting/viewing in units of channel (broadcast station) of contents, renting/viewing can be continued independent of an end of an individual program, and for example, the processing for terminating renting/viewing has only to be performed by separation of the mobile information terminal 11 from the viewing device 35 or by user's input operation.

Consequently, when a user performs simple operation using the mobile information terminal held by the user, the user can view a renting/viewing-desired content program from a broadcast wave or a broadcast channel on the viewing device close to the user anywhere.

Example 4

Further, another embodiment in a case where a content program broadcast using a radio wave and registered by a fee-based contract, and the like is rented and viewed on a viewing device in the vicinity of a mobile information terminal will be described.

In this case, in satellite broadcasting generally widely used, broadcast receiving is restrictively enabled only on a device into which a BS conditional access systems (B-CAS) (trademark) card is inserted by inserting the B-CAS card into a viewing device for viewing a broadcast content program, a video recorder for recording, and the like because of content copyright protection and correspondence to accounting for pay broadcast including a case of terrestrial digital broadcasting (a B-CAS card system or a restrictive receiving system).

In a case of viewing a content program of pay broadcasting, control is made so that only a user who contracts in a state in which information in a B-CAS card and user identification information are linked can view the contracted content program on a viewing device into which the B-CAS card is inserted. The B-CAS card includes B-CAS card ID for identifying the B-CAS card, Entitlement Management Message (EMM) information (equivalent to the individual information) transmitted together with a master key unique to this card and a broadcast wave, and the like, and the EMM information includes contract information (a type and a term of pay broadcasting) for every contracting user, a work key (equivalent to the first key) for decrypting Entitlement Control Message (ECM) information (equivalent to the common information), and the like. The ECM information includes a scrambling key for encrypting the content program, and the like.

For example, when a specific content program A of pay broadcasting is contracted, the EMM information including the work key encrypted corresponding to the broadcast content program A is transmitted to B-CAS card ID of a contracting user through an airwave and the EMM information is rewritten. The work key of the broadcast content program A is decrypted using the master key unique to the B-CAS card and is extracted. Next, the ECM information distributed together with the airwave is decrypted using the extracted work key of the broadcast content program A and a scrambling key is extracted. Further, video and audio of the broadcast content program A distributed through the airwave are decrypted using the extracted scrambling key so as to enable viewing the broadcast content program A.

However, in this case, when the user contracting viewing of the content program of pay broadcasting tries to view the contracted broadcast content program on another viewing device except a viewing device into which the linked B-CAS card is inserted, the B-CAS card is brought to another viewing-desired viewing device and is required to be inserted into it, and for the user who makes a fee-based contract, it is very inconvenient.

Figure 8:
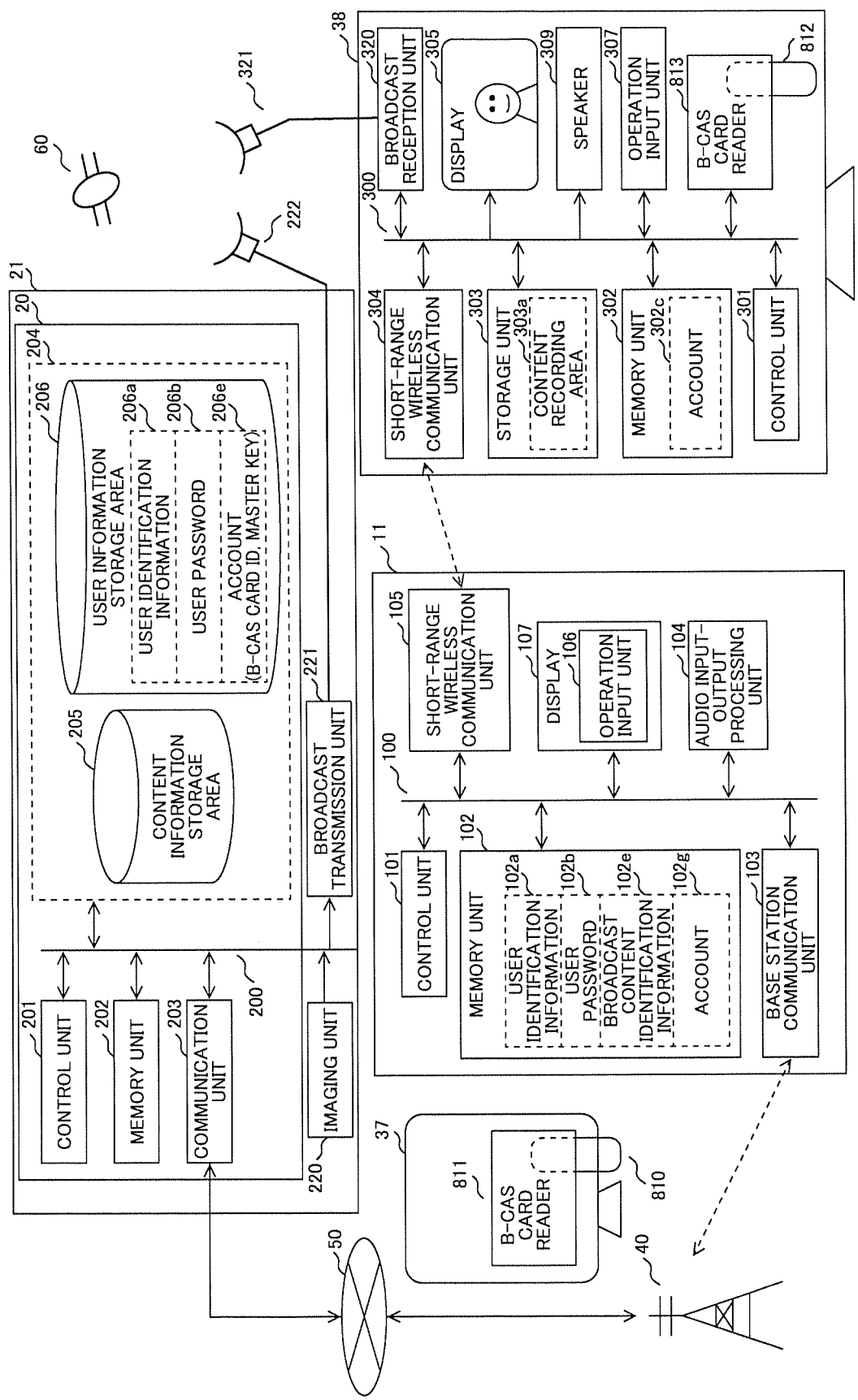
FIG. 8 is a block diagram showing an example of another configuration of the content viewing system.

FIG. 8 is a block diagram showing an embodiment of a content viewing system according to the embodiment for settling the abovementioned problem. As shown in FIG. 8, a viewing device 37 equipped with a B-CAS card 810 and a B-CAS card reader 811 and a viewing device 38 equipped with a B-CAS card 812 and a B-CAS card reader 813 are provided in addition to or in place of each configuration which is shown in FIG. 6 and to which the same reference number is allocated. In FIG. 8, the same reference numeral is allocated to the same processing unit as each processing unit in the embodiment shown in FIG. 6 and description of them is omitted.

The viewing device 37 having the similar configuration to that of the viewing device 35 reads/writes data from/to the B-CAS card 810 inserted into the viewing device 37 by the B-CAS card reader 811. The viewing device 38 having the similar configuration to that of the viewing device 35 reads/writes data from/to the B-CAS card 812 inserted into the viewing device 38 by the B-CAS card reader 813. As for the viewing device 37, viewing of the specific content program is already registered by a user by the fee-based contract, and the like, in the B-CAS card 810, B-CAS card ID linked with user identification information and the master key unique to the B-CAS card are recorded, and in broadcast-side equipment 21, the B-CAS card ID linked with the user identification information and the master key unique to the B-CAS card are stored.

The user identification information is transmitted to the broadcast-side equipment 21 from a mobile information terminal 11. The broadcast-side equipment 21 authenticates the user and transmits the B-CAS card ID stored in a user information storage area 206 in a state linked with the user identification information and a master key 206e as an account to the mobile information terminal 11 on the basis of a result of the authentication. The mobile information terminal 11 transmits the received account 102g to the viewing device 38 in the vicinity of the mobile information terminal 11 via a short-range wireless communication unit 105. The viewing device 38 decrypts and decodes the broadcast content program using B-CAS card ID and the master key respectively included in an account 302c received via a short-range wireless communication unit 304 in place of the B-CAS card ID and the master key respectively recorded in the B-CAS card 812 inserted into the viewing device 38.

Consequently, the user contracting viewing of the content program of pay broadcasting can view the contracted content program on another viewing-desired viewing device usably without inserting the B-CAS card linked with the user into the other viewing-desired viewing device by transmitting information in the B-CAS card inserted into the viewing device linked with the user to the other viewing device for renting using the mobile information terminal. That is, the user can view the viewing-desired content program rented though the broadcast wave on the viewing device in the vicinity of the user anywhere using the mobile information terminal held by the user.

Next, an operational example of the content viewing system shown in FIG. 8 will be described.

FIG. 9 show one example of an operational sequence of the content distribution system shown in FIG. 8. In FIG. 9, the same operation as the operation already described in FIGS. 2, 5, 7 is allocated to each sequence which is shown in FIGS. 2, 5, 7 and to which the same reference numeral is allocated, and therefore detailed description of them is omitted.

In FIG. 9A, steps S201 to S707 are similar to the operational sequence described referring to FIG. 7A. The mobile information terminal 11 that receives a result of authentication transmits input and set viewing-desired broadcast content identification information and requests issue of an account as a result of authenticating renting/viewing of the broadcast content program from the viewing device A to the viewing device B (S908).

The content distribution server 20 extracts the B-CAS card ID of the B-CAS card 810 inserted into the viewing device 37 and linked with the user identification information and the master key 206e from the user information storage area 206 on the basis of a user authentication result, issues and stores an account having the extracted B-CAS card ID and the extracted master key (S909), and transmits the account to the mobile information terminal 11 (S910).

The mobile information terminal 11 stores the received account in a memory unit 102 as an account 102g (S911a). According to the abovementioned account generation process, after user authentication, the B-CAS card ID of the viewing device 37 linked with the user, the master key and the viewing-desired broadcast content identification information can be stored in the mobile information terminal as the account (S900a).

Figure 9B:
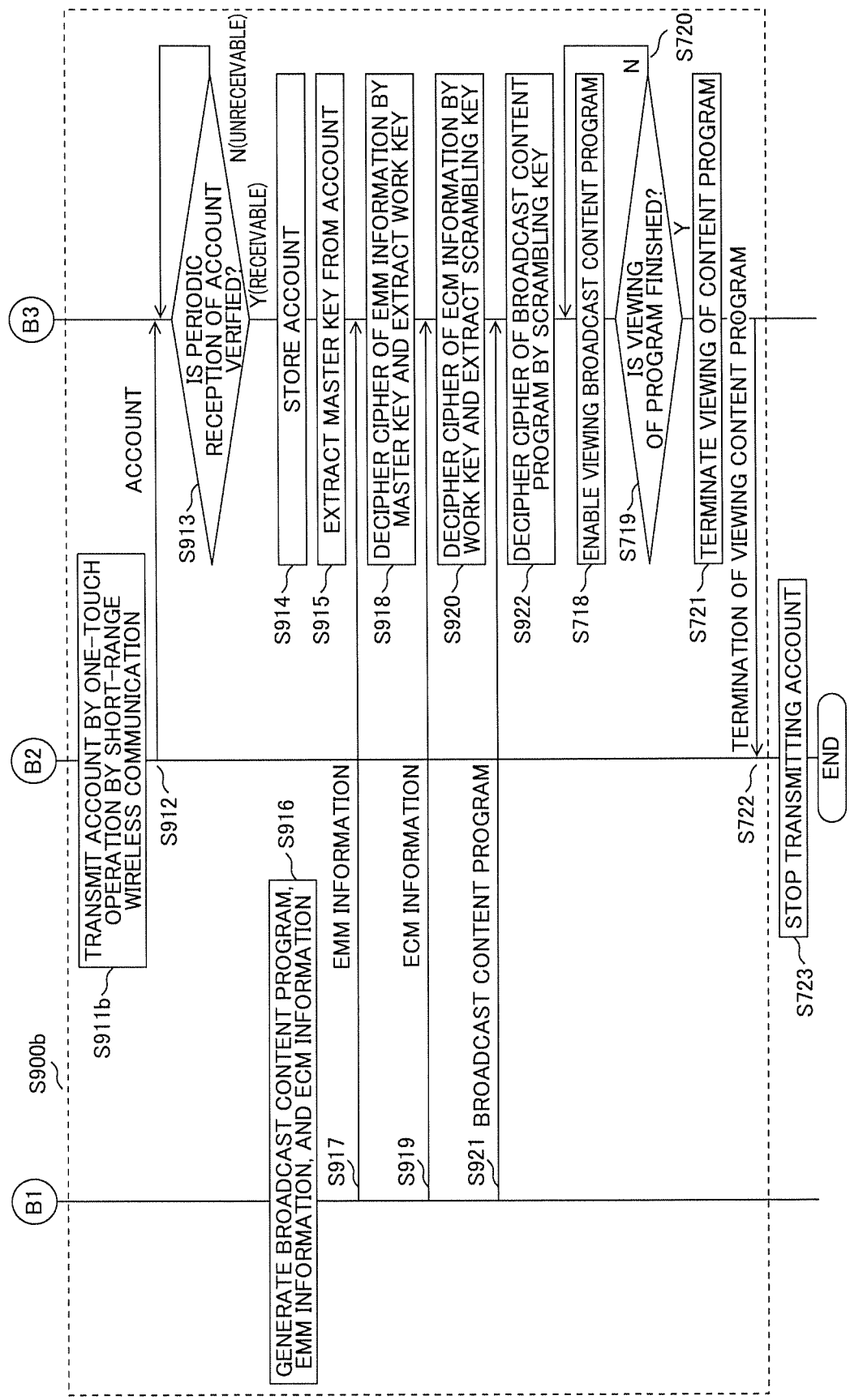
FIG. 9B shows a latter half of the example of the operational sequence of the content viewing system shown in FIG. 6.

Next, as shown in FIG. 9B, when the user closely holding the mobile information terminal 11 approaches the viewing-desired viewing device 38 and further, performs simple one-touch input operation on an operation input unit 106, the mobile information terminal 11 starts transmitting the account 102g by short-range wireless communication via the short-range wireless communication unit 105 (S911b). The transmitted account 102g is transmitted to the viewing device 38 in the vicinity of the mobile information terminal 11 (S912).

The viewing device 38 periodically executes discrimination processing of whether the account 102g transmitted from the mobile information terminal 11 by short-range wireless communication exists in a receivable close range and can be received or the account 102g is outside the receivable close range and cannot be received at a certain fixed interval (S913).

When the viewing device 38 can receive the account 102g, the viewing device 38 stores the received account 102g in a memory unit 302 as an account 302c (S914) and extracts a master key stored as the account 302c (S915). That is, a broadcast reception unit 320 in the viewing device 38 decrypts the broadcast content program using the master key of the viewing device 37 stored in the viewing device 38 as the account 302c in place of the master key in the B-CAS card to be inserted into the viewing device 38.

In broadcasting the content program, the broadcast-side equipment 21 generates and encrypts the broadcast content program, ECM information and EMM information (S916), and when the contracted viewing-desired broadcast content program is broadcast via a broadcast satellite 60, the EMM information including the encrypted work key of the viewing-desired content program is transmitted to B-CAS card ID stored in the viewing device 38 as the account 302c through the airwave, and the EMM information is rewritten (S917). The received EMM information is decrypted using the master key unique to the B-CAS car, and the EMM information is rewritten (S817). The received EMM information is decrypted using the master key unique to the B-CAS card and the work key of the content program is extracted (S918).

Next, the ECM information is distributed together with the airwave (S919), the ECM information is decrypted using the work key, and a scrambling key is extracted (S920). The viewing-desired broadcast content program is encrypted and is broadcast toward the viewing device 38 (S921), and video and audio of the viewing-desired broadcast content program are decrypted and decoded using the extracted scrambling key (S922). Therefore, the user can view a video signal and an audio signal of the decrypted and decoded broadcast content program on a display 305 via a speaker 309 (S718) as described referring to FIG. 7.

In addition, it is discriminated whether the distributed content program is finished or not (S719), when distribution of the content program to the viewing device is not finished, the distribution is continued and viewing of the content program is continued (S720), when the distribution of the content program to the viewing device is finished, the viewing of the program is finished (S721), and information showing an end of the viewing of the program is transmitted to the mobile information terminal 11 from the viewing device 38 (S722). The mobile information terminal 11 receives the end of the viewing of the content program, stops transmitting the account 102g to the viewing device 38 (S723), and terminates the viewing of the content on the viewing device by renting the account.

It goes without saying that, for timing for stopping transmission of the account 102g from the mobile information terminal 11 to the viewing device 38, the timing is not required to be after the abovementioned end of the viewing of the content program and if only the timing is after the viewing on the viewing device 38 is started, the timing may be at any timing till the end of the viewing. In this case, the mobile information terminal 11 can stop the transmission of the account by transmitting information showing the stop of the transmission of the account 102g from the viewing device 38 to the mobile information terminal 11 after the viewing of the content program is started (S723).

According to the abovementioned broadcast content viewing process by the transmission/reception of the account, the mobile information terminal transmits/receives the account, the user rents information of the B-CAS card inserted into the registered viewing device 37 to the viewing device 38, and the broadcast content program can be viewed on the viewing device 38 (S900b).

As described referring to FIG. 7, in the abovementioned example, the case where the content program is rented and viewed in units of program is described. However, it is evident that the similar action and effect are also acquired if only a request for renting/viewing is replaced with a unit of a channel of contents in place of the unit of the content program except for viewing termination processing in a case of renting/viewing in units of channel (broadcast station) of contents. In addition, in the case of renting/viewing in units of channel (broadcast station) of contents, processing for terminating renting/viewing has only to be performed by separating the mobile information terminal 11 from the viewing device 38 or by user input operation for example because renting/viewing are enabled regardless of an end of an individual program.

Consequently, there is produced an effect that the user can view the renting/viewing-desired content program or the broadcast channel through the airwave on the viewing device close to the user by simple one-touch operation using the mobile information terminal held by the user without bringing and installing the B-CAS card.

In addition, for a method of protecting copyright of contents of a digital broadcast, except the abovementioned method of using the physical B-CAS card, a method of controlling by software without depending the B-CAS card (a content protection method) is also used in a viewing device such as a tablet and a smartphone respectively equipped with a television viewing function. As in the case of the B-CAS card method, the content protection method is also operated on the basis of the transmission through a broadcast of the ECM information and the EMM information and the decryption of the content program by the master key, the work key and the scrambling key, and it need scarcely be said that the similar operation, action and effect can be realized by the operational sequence example shown in FIG. 9.

In the abovementioned embodiments, it is detected and recognized by short-range wireless communication that the mobile information terminal held by the user approaches the viewing device. However, the mobile information terminal and the viewing device are respectively equipped with a global positioning system (GPS) receiving unit and both approaches may also be detected and recognized using each positional information piece detected by each GPS receiving unit. For example, positional information detected by the GPS receiving unit of the mobile information terminal may be transmitted to the viewing device by short-range wireless communication, the viewing device may collate the received positional information of the mobile information terminal and positional information detected by the GPS receiving unit of the viewing device, and the viewing device may discriminate that the mobile information terminal and the viewing device are located close and the user is located in a range in which the user can view the content program on the viewing device.

The content distribution system and the content viewing system that respectively provide user-friendly viewing environment are provided by using the technique described in the abovementioned embodiments when the user holding the mobile information terminal rents and views the content program or the broadcast channel respectively registered beforehand on the viewing device in the vicinity of the user.

In addition, effectiveness of protecting contents can be enhanced further by limiting renting and distribution of the content program to the viewing device that receives the account from the content distribution server to the unit of the program, for example, only one program including the abovementioned case of relay viewing in the abovementioned embodiments of the content distribution system.

In the abovementioned embodiments of the content viewing system, the effectiveness of protecting contents can be enhanced by limiting renting and viewing of the broadcast content program to/on the viewing device that receives a broadcast wave to only the viewing device that receives the account and the unit of the program (only one program).

Further, in the content distribution server and the broadcast-side equipment, the effectiveness of protecting contents can be enhanced by performing accounting processing in units of rented content program for compensation for distribution and viewing of the content program in issuing the account.

The present invention is not limited to the abovementioned embodiments and various variations are included. For example, the abovementioned embodiments are detailedly described to clarify the present invention and the present invention is not necessarily limited to the abovementioned all configurations. In addition, a part of the configuration in one embodiment can be replaced with the configuration in another embodiment and moreover, the configuration in another embodiment can also be added to the configuration in one embodiment. Further, the configuration in another embodiment can be added, deleted and replaced to/from/ with a part of the configuration in each embodiment.

Furthermore, a part or the whole of the abovementioned each configuration, each function, each processing unit, each processing means, and the like may also be realized by hardware such as designing by an integrated circuit. Furthermore, the abovementioned each configuration, each function, and the like may also be realized by software by interpreting and executing a program for making a processor realize respective functions. Information for realizing each function such as a program, a table and a file can be stored in a recording device such as a memory, a hard disk and a solid state drive (SSD) or on a record medium such as an IC card, an SD card and DVD.

Furthermore, as for a control line and an information line, only those required for explanation are shown, and all control lines and all information lines in the product are not necessarily shown. Actually, it is considered that substantially all configurations are mutually connected.

INDUSTRIAL APPLICABILITY

The present invention can be utilized for a content distribution system for distributing contents to a viewing device connected to a network and a content viewing system for viewing contents on a viewing device that receives a broadcast wave.

REFERENCE SIGNS LIST

10, 11: Mobile information terminal, 20: Content distribution server, 21: Transmission-side equipment, 30, 31, 32, 35, 37, 38: Viewing device, 40: Base station, 50: External network, 60: Broadcast satellite, 100, 200, 300: Bus, 101, 201, 301: Control unit, 102, 202, 302: Memory unit, 103: Base station communication unit, 104: Audio input-output processing unit, 105: Short-range wireless communication unit, 106, 307: Operation input unit, 107, 305: Display, 203, 306: Communication unit, 204: Storage, 205: Content information storage area, 206: User information storage area, 303: Storage unit, 309: Speaker, 220: Imaging device, 221: Broadcast transmission unit, 222: Transmission antenna, 320: Broadcast reception unit, 321: Reception antenna, 810, 812: B-CAS card, 811, 813: B-CAS card reader

The invention claimed is:

1. A content viewing method using a viewing system including a content distribution server that distributes contents, a mobile information terminal, and a viewing device that reproduces a content, comprising:
    a first step in which the mobile information terminal transmits user identification information and a user password to the content distribution server;
    a second step in which the content distribution server authenticates the mobile information terminal based on the user identification information and the user password from the mobile information terminal;
    a third step in which the mobile information terminal transmits an account issue request for requesting an account for reproducing a desired content to the content distribution server;
    a fourth step in which the content distribution server issues the account based on the account issue request from the mobile information terminal and transmits the issued account to the mobile information terminal;
    a fifth step in which the mobile information terminal stores the account from the content distribution server;
    a sixth step in which the mobile information terminal transmits the stored account by short-range wireless communication;
    a seventh step in which the viewing device stores the account received by the short-range wireless communication; and
    an eighth step in which the viewing device reproduces the desired content using the stored account,
    wherein the content distribution server, the mobile information terminal, and the viewing device are connected via a network; and
    wherein in the eighth step, the viewing device transmits the account to the content distribution server via the network so as to request viewing, receives the desired content transmitted by the content distribution server according to the viewing request, and reproduces the desired content,
    wherein in the sixth step, the mobile information terminal continuously transmits the stored account by short-range wireless communication; and
    wherein the viewing device executes a ninth step in which the viewing device transmits a viewing halt request to the content distribution server via the network when reception of the account continuously transmitted is interrupted during execution of the eighth step and the viewing device interrupts reproduction of the desired content when the content distribution server halts transmission of the desired content according to the viewing halt request.

2. The content viewing method according to claim 1, wherein the viewing device executes a tenth step in which the viewing device transmits the account to the content distribution server via the network so as to request viewing when reception of the account is resumed after the reception of the continuously transmitted account is interrupted and the ninth step is executed, receives the desired content transmitted by the content distribution server according to the viewing request, and resumes the interrupted reproduction of the desired content.

3. The content viewing method according to claim 1, further comprising, after the viewing device executes the ninth step using a second viewing device apart from the viewing device:
- an eleventh step in which the mobile information terminal transmits the stored account by short-range wireless communication;
- a twelfth step in which the second viewing device stores the account received by short-range wireless communication; and
- a thirteenth step in which the second viewing device transmits the account to the content distribution server via the network so as to request viewing, receives the desired content transmitted by the content distribution server according to the viewing request, and resumes interrupted reproduction of the desired content.

4. The content viewing method according to claim 3,
wherein in the ninth step, further, the viewing device transmits viewing interruption information showing a viewing interrupted position or viewing interrupted time of the desired content to the mobile information terminal when the reception of the continuously transmitted account is interrupted and the mobile information terminal stores the viewing interruption information;
in the eleventh step, further, the mobile information terminal transmits the stored viewing interruption information to the second viewing device by the short-range wireless communication; and
in the thirteenth step, further, the second viewing device resumes the interrupted reproduction of the desired content from the viewing interrupted position or the viewing interrupted time based on the received viewing interruption information.

5. The content viewing method according to claim 1, wherein the mobile information terminal starts or halts transmitting the stored account by the short-range wireless communication according to operation of a user.

6. A content viewing method using a viewing system including a content distribution server that distributes contents, a mobile information terminal, and a viewing device that reproduces a content, comprising:
- a first step in which the mobile information terminal transmits user identification information and a user password to the content distribution server;
- a second step in which the content distribution server authenticates the mobile information terminal based on the user identification information and the user password from the mobile information terminal;
- a third step in which the mobile information terminal transmits an account issue request for requesting an account for reproducing a desired content to the content distribution server;
- a fourth step in which the content distribution server issues the account based on the account issue request from the mobile information terminal and transmits the issued account to the mobile information terminal;
- a fifth step in which the mobile information terminal stores the account from the content distribution server;
- a sixth step in which the mobile information terminal transmits the stored account by short-range wireless communication;
- a seventh step in which the viewing device stores the account received by the short-range wireless communication; and
- an eighth step in which the viewing device reproduces the desired content using the stored account,
wherein the content distribution server and the mobile information terminal are connected via a network,
wherein the content is encrypted and is distributed from the content distribution server to the viewing device,
wherein the account includes key information for decrypting the distributed content,
wherein in the eighth step, the viewing device receives the desired content distributed from the content distribution server, decrypts the desired content using the key information, and reproduces the desired content, and
wherein in the eighth step, the viewing device receives encrypted related information including a scrambling key for decrypting the desired content from the content distribution server, decrypts the related information by the key information, decrypts the desired content using the scrambling key extracted by decrypting the related information, and reproduces the desired content.

7. The content viewing method according to claim 6,
wherein the related information is configured by encrypted first and second related information respectively including first and second keys respectively required for decrypting the desired content; and
the viewing device decrypts the first related information by the key information, decrypts the second related information using the first key extracted by decrypting the first related information, decrypts the desired content using the second key extracted by decrypting the second related information, and reproduces the desired content.

8. A content viewing method using a viewing system including a content distribution server that distributes contents, a mobile information terminal, and a viewing device that reproduces a content, comprising:
- a first step in which the mobile information terminal transmits user identification information and a user password to the content distribution server;
- a second step in which the content distribution server authenticates the mobile information terminal based on the user identification information and the user password from the mobile information terminal;
- a third step in which the mobile information terminal transmits an account issue request for requesting an account for reproducing a desired content to the content distribution server;
- a fourth step in which the content distribution server issues the account based on the account issue request from the mobile information terminal and transmits the issued account to the mobile information terminal;
- a fifth step in which the mobile information terminal stores the account from the content distribution server;
- a sixth step in which the mobile information terminal transmits the stored account by short-range wireless communication;

a seventh step in which the viewing device stores the account received by the short-range wireless communication; and an eighth step in which the viewing device reproduces the desired content using the stored account, wherein the content distribution server and the mobile information terminal are connected via a network, wherein the content is encrypted and is distributed from the content distribution server to the viewing device used for a second viewing device and a first viewing device different from the viewing device, wherein a distribution transmits encrypted first related information including a first key required for decrypting the content and encrypted second related information including a second key together with the content, wherein the first viewing device and the second viewing device can utilize a first device and a second device installed in each viewing device, wherein the first device stores first ID linked with the user identification information and a first master key unique to the first device, wherein the content distribution server stores the first ID and the first master key beforehand, wherein in the fourth step, the content distribution server issues the first ID and the first master key based on the account issue request as an account and transmits the issued account to the mobile information terminal, wherein in the fifth step, the mobile information terminal stores the first ID and the first master key as the account, wherein in the sixth step, the mobile information terminal transmits the first ID and the first master key by short-range wireless communication as the account, wherein in the seventh step, the second viewing device stores the first ID and the first master key as the account, and wherein in the eighth step, the second viewing device decrypts the first related information by the first master key included in the account, decrypts the second related information using the first key extracted by decrypting the first related information, decrypts the content using the second key extracted by decrypting the second related information, and enables reproduction of the content.

9. A mobile information terminal used for a content viewing method using a viewing system including a content distribution server that distributes contents, the mobile information terminal, and a viewing device that reproduces a content, comprising:
 a controller;
 a memory;
 a first communication interface which communicates with the content distribution server;
 a second communication interface, having shorter communication distance than the first communication interface, which communicates with the viewing device; and
 an input unit,
 wherein the memory stores user identification information and a user password,
 wherein the controller controls the first communication interface to transmit the user identification information and the user password to the content distribution server,
 wherein the controller controls the first communication interface to transmit an account issue request for requesting an account to reproduce a desired content to the content distribution server,
 wherein the controller controls the memory to store the account received from the content distribution server,
 wherein the controller controls the second communication interface to continuously or periodically transmit the account, and
 wherein the controller controls the memory to store viewing interruption information showing a viewing interrupted position or viewing interrupted time of the desired content when the second communication interface receives the viewing interruption information from the viewing device.

10. The mobile information terminal according to claim 9, wherein at least one of start, continuation, interruption and resumption of continuous or periodic transmission of the account by the second communication interface is enabled by operation of a user via the input unit.

11. A mobile information terminal used for a content viewing method using a viewing system including a content distribution server that distributes contents, the mobile information terminal, and a viewing device that reproduces a content, comprising:
 a controller;
 a memory;
 a first communication interface which communicates with the content distribution server;
 a second communication interface, having shorter communication distance than the first communication interface, which communicates with the viewing device; and
 an input unit,
 wherein the memory stores user identification information and a user password,
 wherein the controller controls the first communication interface to transmit the user identification information and the user password to the content distribution server,
 wherein the controller controls the first communication interface to transmit an account issue request for requesting an account to reproduce a desired content to the content distribution server,
 wherein the controller controls the memory to store the account received from the content distribution server,
 wherein the controller controls the second communication interface to continuously or periodically transmit the account,
 wherein a content distributed from the content distribution server is distributed broadcast on a first viewing device and a second viewing device after the content is encrypted, and the first viewing device and the second viewing device decode the content using first key information and second key information respectively stored,
 wherein the controller controls the first communication interface to receive the same information as the first key information stored in the first viewing device from the content distribution server via the first communication interface, and controls the memory to store the information as an account, and
 wherein the controller controls the second communication interface to transmit the first key information to the second viewing device by continuously or periodically transmitting the account.

* * * * *